United States Patent
Yajima et al.

(10) Patent No.: US 10,567,400 B2
(45) Date of Patent: Feb. 18, 2020

(54) ATTACK DETECTION DEVICE, ATTACK DETECTION METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Jun Yajima, Kawasaki (JP); Takayuki Hasebe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/711,605

(22) Filed: Sep. 21, 2017

(65) Prior Publication Data

US 2018/0091533 A1    Mar. 29, 2018

(30) Foreign Application Priority Data

Sep. 27, 2016   (JP) .................................. 2016-188826
Jan. 19, 2017   (JP) .................................. 2017-007199

(51) Int. Cl.
*H04L 29/06* (2006.01)
*H04L 12/40* (2006.01)

(52) U.S. Cl.
CPC .......... *H04L 63/1416* (2013.01); *H04L 12/40* (2013.01); *H04L 63/1425* (2013.01); *H04L 2012/40215* (2013.01)

(58) Field of Classification Search
CPC .. H04L 63/1416; H04L 12/40; H04L 63/1425
See application file for complete search history.

(56) References Cited

U.S. PATENT DOCUMENTS

| | | | |
|---|---|---|---|
| 2012/0124221 A1 | 5/2012 | Kondo et al. | |
| 2014/0328352 A1 | 11/2014 | Mabuchi et al. | |
| 2015/0358351 A1* | 12/2015 | Otsuka ................ | H04L 12/4625 726/23 |
| 2016/0205194 A1 | 7/2016 | Kishikawa et al. | |

FOREIGN PATENT DOCUMENTS

| | | |
|---|---|---|
| JP | 2012-109666 | 6/2012 |
| JP | 2014-146868 | 8/2014 |
| WO | WO 2013/094072 A1 | 6/2013 |
| WO | WO 2015/170451 A1 | 11/2015 |

* cited by examiner

*Primary Examiner* — Oleg Korsak
(74) *Attorney, Agent, or Firm* — Staas & Halsey LLP

(57) ABSTRACT

An attack detection device executes a process that includes receiving a message periodically transmitted from a communication device in a network, calculating a reception range for receiving a message including identification information in a reference message selected from the received messages by using a transmission period of a message identified by the identification information, the message being transmitted two or more periods after the reference message, storing the reception range associated with an order of reception of a message predicted to be received in the reception range when the reference message is used as a reference, and determining that an attack on the network is detected when a reception time of the received message including the identification information is not within the reception range associated with the order of reception of the received message in a case where the reference message is used as a reference.

15 Claims, 20 Drawing Sheets

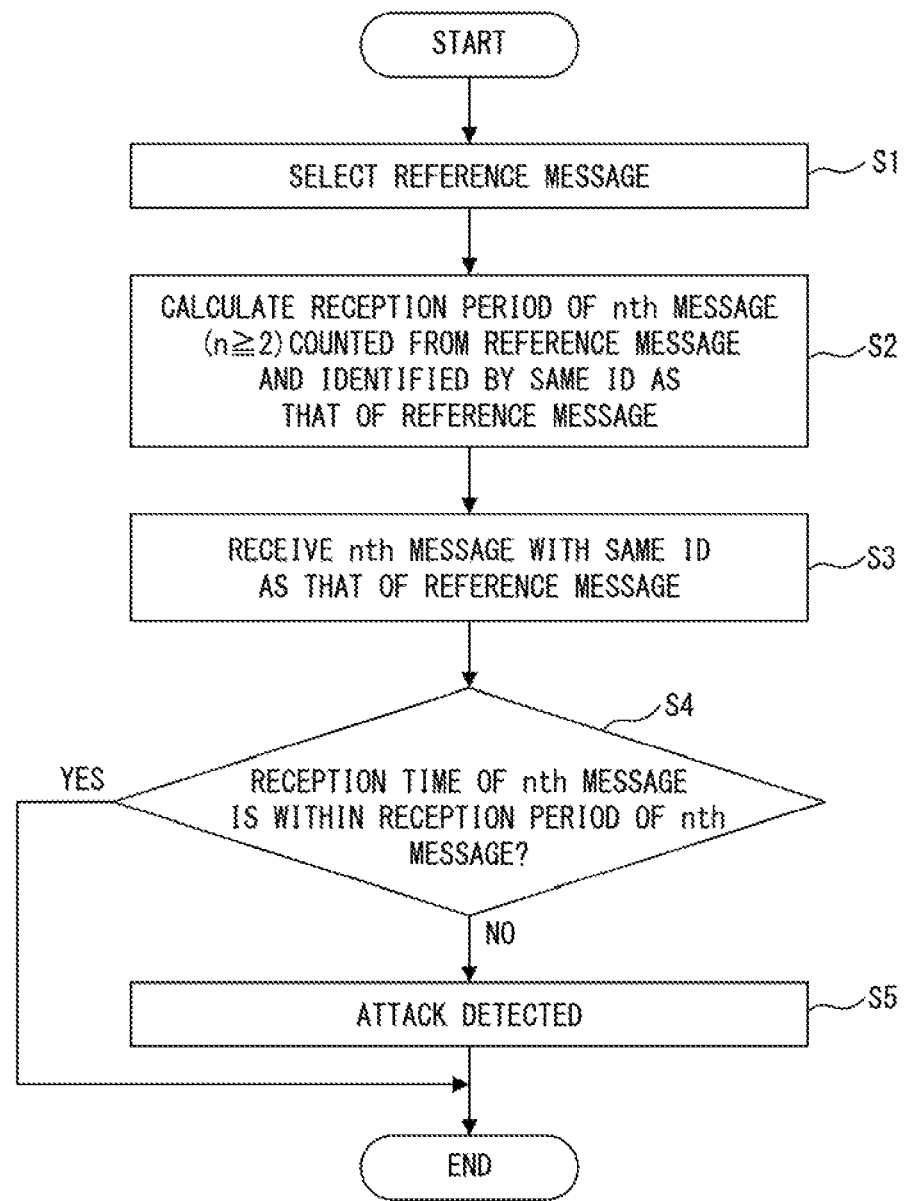
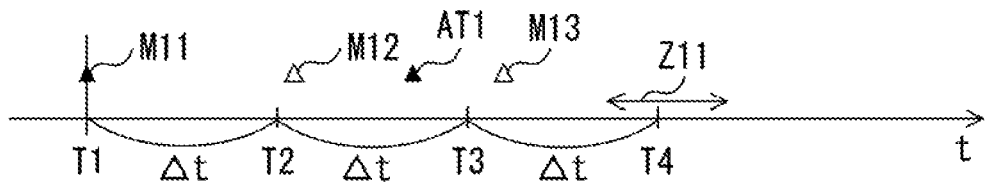
F I G. 2

FIG. 6

| SOF | arbitration | | CTRL | | | DATA | CRC | | ACK | | EOF |
|---|---|---|---|---|---|---|---|---|---|---|---|
| | ID | RTR | IDE | RESERVED | DLC | | CRC SEQUENCE | CRC DELIMITER | ACK SLOT | ACK DELIMITER | |
| 1 | 11 | 1 | 1 | 1 | 4 | 0-64 | 15 | 1 | 1 | 1 | 7 |

F11

| SOF | arbitration | | | | | CTRL | | | | DATA | CRC | | ACK | | EOF |
|---|---|---|---|---|---|---|---|---|---|---|---|---|---|---|---|
| | ID BASE | SRR | IDE | EXTENDED ID | RTR | r1 | RESERVED | DLC | | | CRC SEQUENCE | CRC DELIMITER | ACK SLOT | ACK DELIMITER | |
| 1 | 11 | 1 | 1 | 18 | 1 | 1 | 1 | 4 | | 0-64 | 15 | 1 | 1 | 1 | 7 |

| ID | PERIOD | MARGIN |
|---|---|---|
| 0x123 | 100ms | 40ms |
| ... | ... | ... |

31

| ID | REFERENCE TIME |
|---|---|
| 0x123 | 0ms |
| ... | ... |

33

| ORDER OF RECEPTION COUNTED FROM REFERENCE MESSAGE | RECEPTION RANGE |
|---|---|
| 1 | 60ms~140ms |
| 2 | 160ms~240ms |
| 3 | 260ms~340ms |
| ... | ... |

34

ATTACK DETECTION DEVICE, ATTACK DETECTION METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Applications No. 2016-188826, filed on Sep. 27, 2016, and No. 2017-007199, filed on Jan. 19, 2017, the entire contents of which are incorporated herein by reference.

FIELD

The embodiments discussed herein are related to an attack detection device, an attack detection method, and a non-transitory computer-readable recording medium.

BACKGROUND

A network technology called Controller Area Network (CAN) may be used for transmitting/receiving data or control information between devices that are used in an in-vehicle network of automobiles and in factory automation etc. A system that uses CAN is multiple Electronic Control Units (ECUs). Such ECUs communicate with each other by transmitting/receiving data frames. The data frames that are used for communications in CAN-bus include identification information (ID) that is used to identify each of the data frames. The ID of data frames to be received is stored in advance in each ECU. Because data frames are broadcast in CAN-bus, plural data frames reach an ECU that is connected to CAN-bus at the same time. When the transmission timing is the same between plural data frames, priorities of the data frames are determined on the basis of the value of the ID included in each of the data frames, and a higher-priority data frame is transmitted first. A lower-priority data frame is broadcast after a higher-priority data frame is transmitted. When data frames are broadcast, each ECU receives data frames with the ID set to be received by the ECU, but data frames with an ID that is not set as a reception target of the ECU are discarded.

However, an ECU, when the network is attacked by using a data frame with an ID that is set to cause the ECU to receive, would receive the frame used for the attack. Due to the reception of the frame, the ECU that received the frame used for the attack may possibly perform false operations that are not performed normally. In the meantime, when data frames are transmitted periodically, an attacking frame is transmitted at a transmission timing that deviates from the transmission timings of normal data frames. By taking this point into consideration, the method that has been attempted is a method of detecting an attack by determining whether the received frames were transmitted at the predetermined transmission timings of data frames. However, a transmission timing of a data frame may be changed in relation with transmission timings of other data frames. In view of this problem, an ECU on the receiving side prevents false detection by using a margin at the time of determining the deviation, but when the margin is too narrow, false detections may occur frequently.

FIG. 1 is a diagram explaining an example of such an attack detection method. In the case C1, for example, data frames (periodic messages) are transmitted with a period of 100 milliseconds (ms) and a margin is set to be 10 milliseconds. Assume that one of the ECUs received the first periodic message M1 at 0 ms. When the same ECU receives a periodic message M2 within a period of time (Z1) between 90 ms and 110 ms after the reception of the periodic message M1, the ECU determines, using the margin, that the periodic message M2 is not an attacking message. Assume that this ECU received the second periodic message M2 at 101 ms. The difference between the reception time of the periodic message M1 and the reception time of the periodic message M2 is 101 ms, which is within a range of the period calculated in consideration of the margin, and therefore the ECU determines that the periodic message M2 is not an attacking message. The ECU predicts that the period in which the third periodic message is to be received is from 191 ms to 211 ms after the reception of the periodic message M1, as indicated as Z2 in FIG. 1.

Next, assume that the same ECU received the third periodic message M3 at 240 ms. In this case, the difference between the reception time of the periodic message M2 and the reception time of the periodic message M3 is 139 ms, which is not within the acceptable range of the period (Z2) calculated in consideration of the margin. Therefore, the ECU would make a false detection such that the periodic message M3 is an attacking message. Furthermore, the ECU calculates the reception interval on the basis of the reception time of the periodic message M3. As illustrated in FIG. 1, when the fourth periodic message is received at 301 ms, the difference between the reception time of the periodic message M3 and the reception time of the periodic message M4 is 61 ms, and the ECU determines that the difference is not within the acceptable range of the period calculated in consideration of the margin. Consequently, the ECU makes another false detection that the periodic message M4 is an attacking message.

The case C2 is an example of setting the margin to be 40 ms when the periodic messages M1 to M4 are evaluated. In this case, when the period between reception of a periodic message and reception of the next periodic message is within 60 ms to 140 ms, it is determined that an attack has not been conducted. Then, because the difference between the reception time of the periodic message M2 and the reception time of the periodic message M3 is 139 ms, it is determined that the periodic message M3 is not an attacking message. In a similar manner, the difference between the reception time of the periodic message M3 and the reception time of the periodic message M4 is 61 ms, and it is therefore determined that the periodic message M4 is not an attacking message either. Note that in order to make a comparison with the case C1, the period of time during which it is possible for the periodic message M2 to be received is indicated as Z3 and the period of time during which it is not possible for the periodic message M3 to be received is indicated Z4 in the case C2.

As a related technology, a technology has been proposed such that when a data frame that does not follow a predetermined rule of a transmission period is received, a specific identifier in the data frame is verified, and whether the data frame is being used for an attack is determined (e.g., Patent Document 1). A system has also been proposed such that when the first data having the same identifier as that of the reference reception data and a reception interval shorter than a predetermined period is received, the system waits for data having the same identifier as that of the first data until a predetermined period elapses after the reception time of the reference reception data. When the second data having the same identifier as that of the first data is received during the period of waiting for the data having the same identifier as that of the first data, this system determines that fraud has occurred (e.g., Patent Document 2). A method that has been proposed is such that an ECU transmits messages at defined communication intervals and an ECU that receives the messages determines whether the received messages are invalid on the basis of a comparison between the communication interval of the received messages and the defined communication interval (e.g., Patent Document 3). In addition, a system has been known such that in a terminal that transmits a connection request to a management control device when a timer expires, the cycle of the timer value can be changed (e.g., Patent Document 4).

RELATED ART DOCUMENT

Patent Document

Patent Document 1: International Publication No. WO2015/170451
Patent Document 2: Japanese Laid-open Patent Publication No. 2014-146868
Patent Document 3: International Publication No. WO2013/04072
Patent Document 4: Japanese Laid-open Patent Publication No. 2012-109666

SUMMARY

According to an aspect of the embodiments, an attack detection device includes a processor configured to execute a process including receiving a message periodically transmitted from a communication device in a network, calculating a reception period for receiving a message including identification information in a reference message selected from the received messages by using a transmission period of a message identified by the identification information, the message being transmitted two or more periods after the reference message, storing the reception period associated with an order of reception of a message predicted to be received in the reception period when the reference message is used as a reference, and determining that an attack on the network is detected when a reception time of the received message including the identification information is not within the reception period associated with the order of reception of the received message in a case where the reference message is used as a reference.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram explaining an example of an attack detection method according to the embodiments;
FIG. 6 is a diagram illustrating examples of the format of a transmitted/received frame;
FIG. 7 is a diagram explaining an example of information stored by the attack detection device.

DESCRIPTION OF EMBODIMENTS

Figure 1:
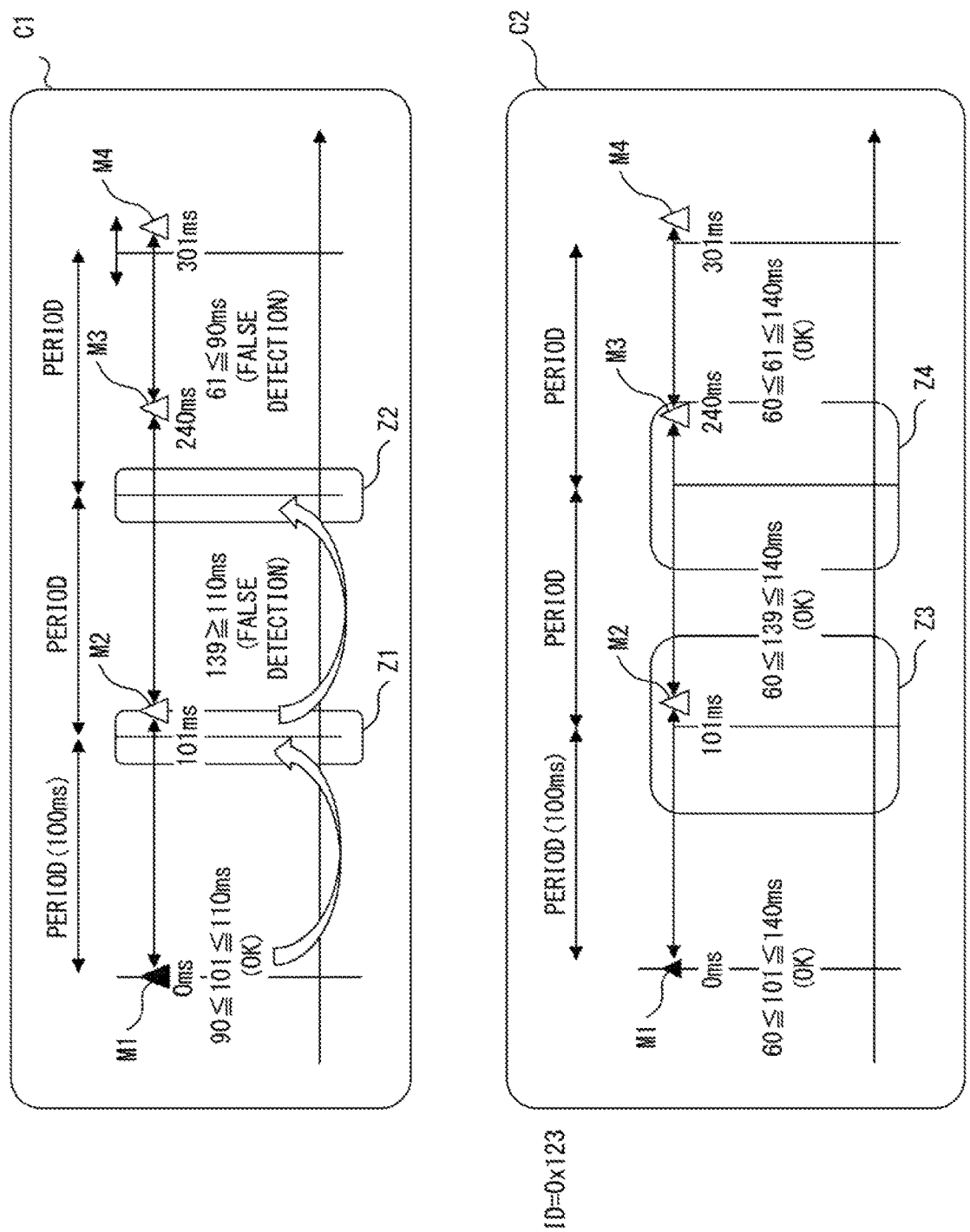
FIG. 1 is a diagram explaining an example of an attack detection method.

In the detection of an attack based on the reception intervals of periodically received messages, wide margins may be requested to prevent false detections. Consequently, while it is possible to prevent a false detection that regards a normal message as an attack, some attacks may be overlooked. However, narrowing margins may result in more frequent false detections. Such a problem is not solved by applying any of the above-described related technologies.

FIG. 2 is a diagram explaining an example of the attack detection method according to the present embodiments. Assume that an attack detection device 10 stores in advance an ID and a transmission period of data frames (periodic messages) that are periodically received. The processing explained below is conducted for each attack detection target ID.

In step S1, the attack detection device 10 selects a reference message used as a reference from among the received periodic messages. The reference message is a message that is a reference for prediction of periods of time in which other messages with the same ID are to be received. The attack detection device 10 calculates a reception range of a periodic message that is identified by the same ID as that of the reference message and is the n-th transmitted message counted from the reference message (step S2). In step S2, n is an integer and is 2 or larger. Although the calculation in step S2 uses a transmission period associated with an ID included in the reference message, the reception time of the reference message can also be used.

Afterwards, the attack detection device 10 receives the n-th periodic message that has the same ID as that of the reference message (step S3). The attack detection device 10 determines whether the reception time of the n-th periodic message is within the range of time predicted as the reception range of the n-th periodic message (step S4). When the reception time of the n-th periodic message is not within the period predicted as the reception range of the n-th periodic message, the attack detection device 10 determines that an attack has been detected (No in step S4, step S5). On the other hand, when the reception time of the n-th periodic message is within the range predicted as the reception range of the n-th periodic message, the attack detection device 10 determines that an attack has not been detected and the processing is terminated (Yes in step S4).

The following descriptions explain attack detection with an example of a case in which periodic messages M11 to M13 are transmitted with a period of $\Delta t$ as the transmission period. Additionally, in this example, an ID of the periodic messages M11 to M13 is IDa, and the variable n in step S2 to S4 is 3. Assume that the attack detection device 10 receives the periodic message M11 at a point in time T1 and selects the periodic message M11 as a reference message. The attack detection device 10 calculates the reception range Z11 of a periodic message to be transmitted 3 periods after the reception of the reference message M11. In the example of FIG. 2, Z11 is a range indicated by arrows provided around a point in time T4. Note that the point in time T4 satisfies $T4=T1+3\times\Delta t$.

Assume that following the reference message M11, the periodic message M12 is transmitted. When the attack detection device 10 receives the periodic message M12, the attack detection device 10 determines that the first message counted from the reference message M11 from among the periodic messages that are identified as IDa is received.

Next, assume that an attacking frame AT1 that includes IDa is transmitted. When the attacking frame AT1 is received, the attack detection device 10 handles the attacking frame AT1 as the second message counted from the reference message M11 from among the periodic messages identified as IDa. Assume that the periodic message M13 is transmitted afterward. When the periodic message M13 is received, the attack detection device 10 determines that the third message counted from the reference message M11 from among the periodic messages identified as IDa is received.

Then the attack detection device 10 determines whether the reception time of the periodic message M13 is within the range Z11 calculated as the reception range of the third message counted from the reference message M11. In the example of FIG. 2, the reception time of the periodic message M13 is around the point in time T3. However, Z11 is a range indicated by the arrows placed around the point in time T4. Therefore, the reception time of the periodic message M13 is not within Z11. Accordingly, the attack detection device 10 determines that an attack that uses IDa was conducted between the reception of the periodic message M11 and the reception of the periodic message M13.

In this manner, the method according to the embodiments predicts a reception range of a message transmitted after several periods from the reference message, and determines whether an attack was conducted in consideration of which message counted from the reference message the predicted reception range was predicted for. For that reason, an attack can be detected even though the prediction allows a wide margin for delays in messages.

<Device Configuration>

Figure 3:
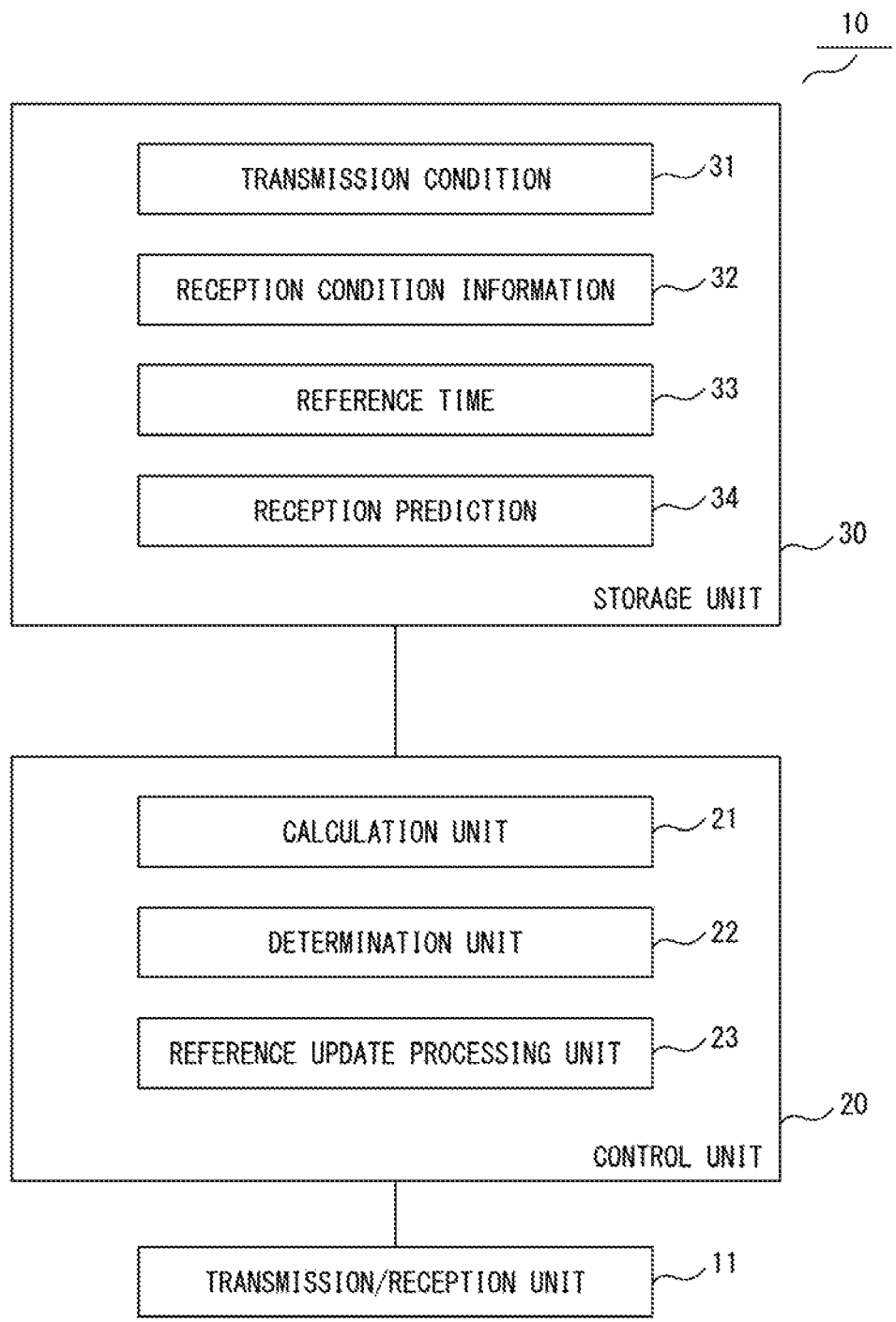
FIG. 3 is a diagram explaining an example of a configuration of the attack detection device.

FIG. 3 is a diagram explaining an example of the configuration of the attack detection device 10. The attack detection device 10 has a transmission/reception unit 11, a control unit 20 and a storage unit 30. The control unit includes a calculation unit 21, a determination unit 22, and a reference update processing unit 23. The storage unit 30 stores a transmission condition 31, a reception condition information 32, a reference time 33, and a reception prediction 34.

The transmission condition 31 associates an ID included in a periodic message received by the attack detection unit 10 with the transmission period of the periodic message identified by the ID. The reception condition information 32 records the order of reception counted from the reference message for each of the periodic messages received by the attack detection device 10 and the reception time of each of these periodic messages. Note that in order to reduce memory capacity, the reception condition information 32 may record the order of reception and the reception time of only the last received periodic message counted from the reference message. For example, instead of calculating and recording the reception time for each of the first to the 100th messages counted from one reference message, the reception condition information 32 may calculate and record the reception time of the 100th message. The reference time 33 records the reception time of the reference message. The reception condition information 32 is generated for each ID of the periodic messages. Examples of the transmission condition 31, the reception condition information 32, and the reference time 33 are described later.

The calculation unit 21 calculates a reception prediction of each periodic message for each ID by using the reference time 33 and the transmission condition 31. The calculation unit 21 stores the obtained calculation results in the reception prediction 34. For that reason, the reception prediction 34 is generated for each ID. An example of the reception prediction 34 is also described later.

The determination unit 22 finds out to which of the messages that have the same ID as that of the reference message the message received by the transmission/reception unit 11 corresponds; in particular, the determination unit 22 finds out to which of the first, second, third, and so on of the messages that have the same ID as that of the reference message the message received by the transmission/reception unit 11 corresponds. The determination unit 22 determines whether the reception time of the received message is within the reception range associated with the obtained order of reception. At that time, the determination unit 22 refers to the reception prediction 34 as appropriate.

The reference update processing unit 23 selects a reference message from the received periodic messages. Note that the reference update processing unit 23 may update a reference message on a regular basis, or after an attack is detected, the attack-detected message itself or a message that is received next to the attack-detected message may be selected as a new reference message. When the reference update processing unit 23 selects and updates a reference message, the reception time of the message selected as a reference message is set as the reference time 33.

Figure 4:
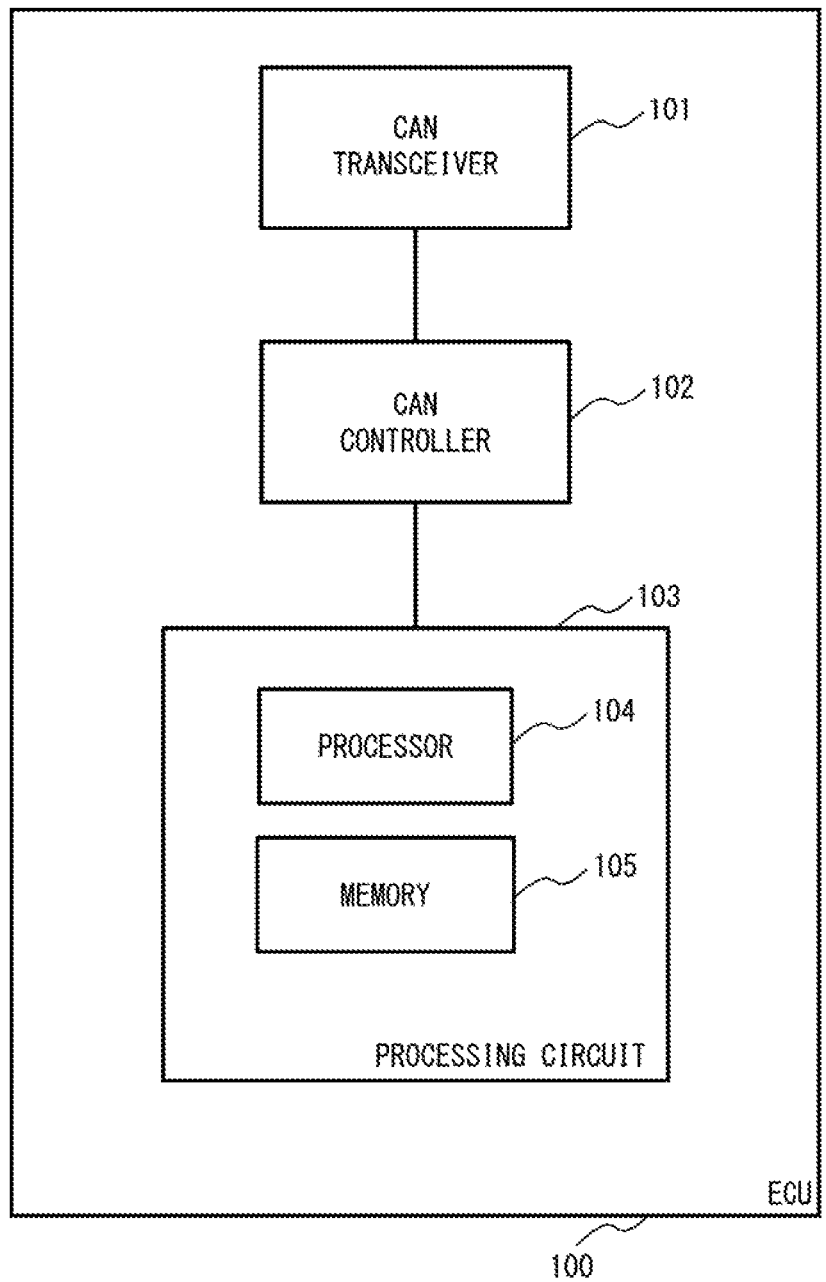
FIG. 4 is a diagram explaining an example of a hardware configuration of the attack detection device.

FIG. 4 is a diagram explaining an example of the hardware configuration of the attack detection device 10. In the example of FIG. 4, the attack detection device 10 is realized as an ECU 100. The ECU 100 includes a CAN transceiver 101, a CAN controller 102, and a processing circuit 103. The processing circuit 103 has a processor 104 and a memory 105.

The CAN transceiver 101 performs processing such as bus voltage adjustment as appropriate so that the ECU 100 can communicate with other devices in a CAN network. The CAN controller 102 extracts data by performing processing such as Cyclic Redundancy Check (CRC) and bit stuffing of the received frames. The CAN controller 102 outputs the data to the processor 104. The processor 104 is any processing circuit and can be a Central Processing Unit (CPU) as an example. The processor reads the programs stored in the memory 105 and performs processing. Note that the ECU 100 may have a device to retrieve programs and data from a storage medium. In this case, the programs may be recorded in any storage medium and may be retrieved by the ECU 100 from the storage medium as appropriate.

In the attack detection device 10, the transmission/reception unit 11 is realized by the CAN transceiver 101 and the CAN controller 102. The processor 104 operates as the control unit 20. The memory 105 operates as the storage unit 30.

<Example of a Network and Frame>

Figure 5:
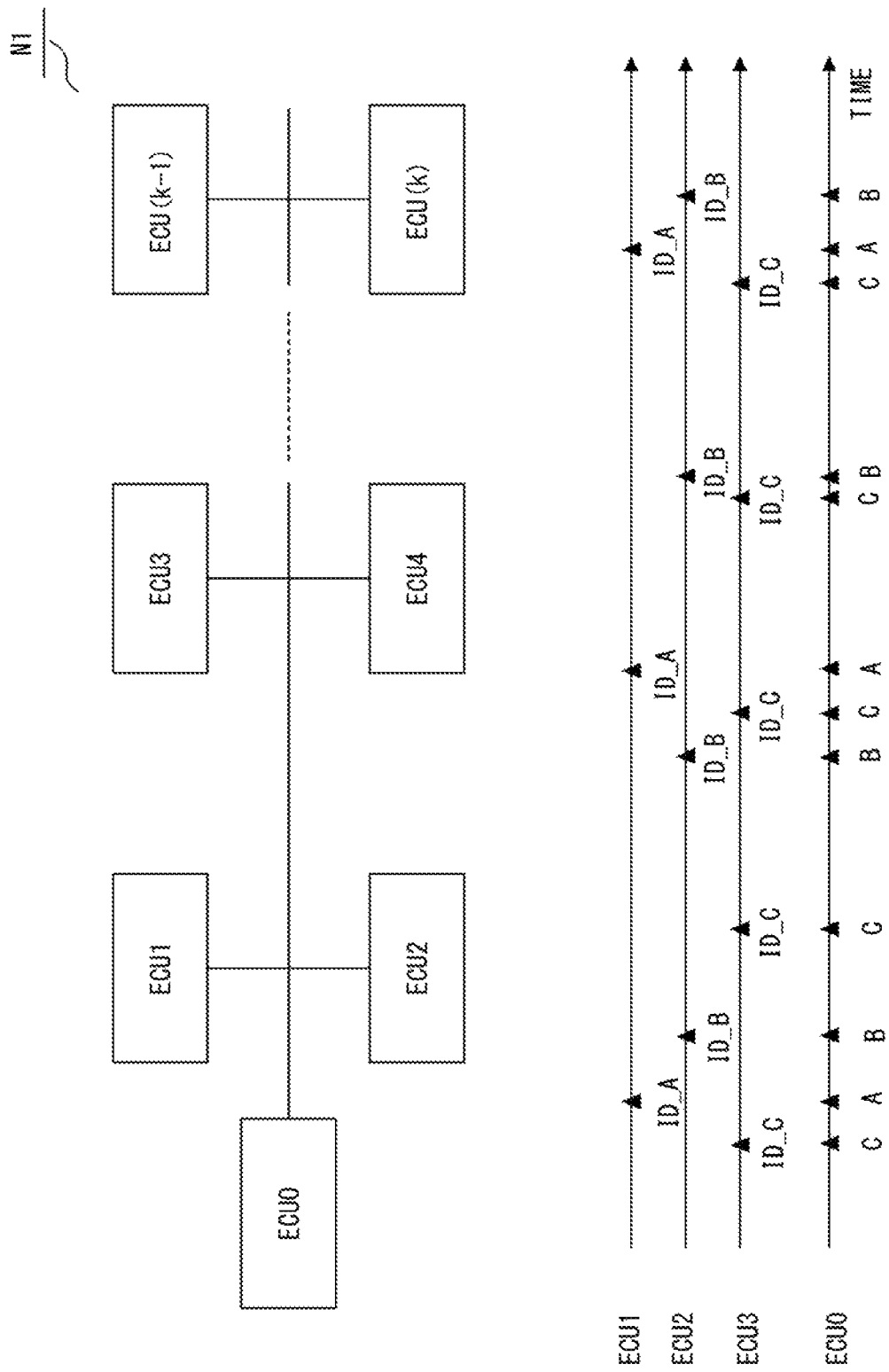
FIG. 5 is a diagram explaining an example of a network.

FIG. 5 is a diagram explaining an example of a network. In a network N1 illustrated in FIG. 5, plural ECUs 100 (ECU0 to ECUk) are connected by a single bus so that frames can be transmitted to/received from each other. Assume that one or more of the ECUs 100 included in the network of FIG. 5 operate(s) as an attack detection device 10. For example, a single attack detection device 10 may detect an attack on all the periodic messages transmitted/received in the network. Alternatively, detection targets may be set for each attack detection device 10 so that an attack on all the periodic messages can be detected by plural attack detection devices 10.

An example of the transmission timing of periodic messages and the reception timing in the attack detection device 10 are also provided in FIG. 5. In the example of FIG. 5, the ECU0 operates as an attack detection device 10 and detects an attack on periodic messages with ID=A, B, and C. In this case, the ECU0 operating as the attack detection device 10 acquires periodic messages with ID=A, B, and C as reception targets. Meanwhile, the ECU1 transmits periodic messages with ID=A, and the ECU2 transmits periodic messages with ID=B. The ECU3 transmits periodic messages with ID=C.

As illustrated in the timing diagram in FIG. 5, the periodic messages with ID=A, B, and C are received by the ECU0 almost at the same time as the timing that each of the periodic messages is transmitted. In the ECU0, an attack is detected by associating the reception timing of a received message with an ID in the message and analyzing the reception timing associated with the ID. Details of the attack detection is described later.

FIG. 6 is a diagram illustrating examples of the format of a transmitted/received frame. F11 in FIG. 6 is an example of the format of a frame having general specifications, and F12 is an example of the format of a frame used in extended specifications.

The frame having general specifications includes an Start of Frame (SOS), an arbitration field, a control field, a data field, a CRC field, an ACK field and an End of Frame (EOF). The arbitration field includes an ID and an Remote Transmission Request (RTR). Here, the ID is identification information used to identify a data frame. The control field includes an Identifier Extension (IDE), a reserved bit and a Data Length Code (DLC). The CRC field includes a CRC sequence and a CRC delimiter. The ACK field includes an ACK slot and an ACK delimiter. Note that bit lengths of the information elements included in the fields are those represented in the bottom row of F11. For example, the length of the ID is 11 bits, and the length of the data field is a variable length ranging from 0 to 64 bits.

The data frame (F12) used in the extended specifications also includes an SOF, an arbitration field, a control field, a data field, a CRC field, an ACK field and an EOF. The arbitration field of the extended specifications includes an ID base, an Substitute Remote Request Bit (SRR), an IDE, an ID extension and an RTR. In the extended specifications, a bit string obtained by concatenating a bit string stored as the ID extension to a bit string stored as the ID base represents identification information (ID) of a data frame. In the format of the extended specifications, fields from the control field to the EOF are similar to those of the format of the general specifications. Moreover, bit lengths of the information elements included in the fields are those described in the bottom row of F12. Accordingly, in the extended format, a bit string of 29 bits in which 11 bits of the ID base is concatenated to 18 bits of the ID extension is used as identification information of a transmission source. Examples of processing executed in the embodiments are described below by taking, as an example, a case where a data frame using the format indicated by F11 of FIG. 6 is transmitted and received. Note that when data frames used for a communication have the extended specifications, the same processing is executed.

First Embodiment

FIG. 7 is a diagram explaining an example of information stored by the attack detection device 10. The attack detection device 10 stores the transmission condition 31 in advance.

The transmission condition 31 includes an ID, a transmission period, and a margin for each of the periodic messages received by the attack detection device 10. The transmission period is a period of time during which a periodic message identified by the ID in the entry is transmitted. The margin is a value used as an acceptable value of a range of deviation from the transmission period when a reception range of a periodic message identified by the ID in the entry is predicted. The transmission condition 31 in FIG. 7 indicates periodic messages with ID=0123 being transmitted with a period of 100 milliseconds and a margin of 40 milliseconds being used for the prediction of the reception range of the periodic messages with ID=0x123. For that reason, when a reference message is received at a point in time T as an example, the reception range of the n-th message counted from the reference message used as a reference (the 0th message) is calculated as T+100 ms×n±40 ms.

The reference update processing unit 23 selects a reference message from the periodic messages received via the transmission/reception unit 11, and records the reception time of the reference message as the reference time 33 in association with the ID included in the reference message. An example of the recorded reference time 33 is provided in FIG. 7. In the example of FIG. 7, a point in time at which the attack detection device 10 received a reference message with ID=0x123 is 0 ms.

When the reference time 33 is updated, the calculation unit 21 generates the reception prediction 34 for each ID by using the transmission period and the margin recorded in the transmission condition 31. In FIG. 7, an example of the generated reception prediction 34 of a periodic message with ID=0x123 is provided. Because a reference message is received at 0 ms, the reference message is considered as the 0th message, and a range of time in which the n-th periodic message counted from the reference message can be received (reception range) is 0 ms+100 ms×n±40 ms. Accordingly, the reception range of a periodic message with ID=0x123 received next to the reference message is 60 ms to 140 ms. Similarly, the reception range of the second periodic message counted from the reference message is 160 ms to 240 ms. The reception range of the third periodic message counted from the reference message is 260 ms to 340 ms. The calculation unit 21 associates the order of reception of each periodic message counted from a reference message when the reference message is the 0th message with the reception range, and records the associated order of reception and reception range in the reception prediction 34.

Figure 8:
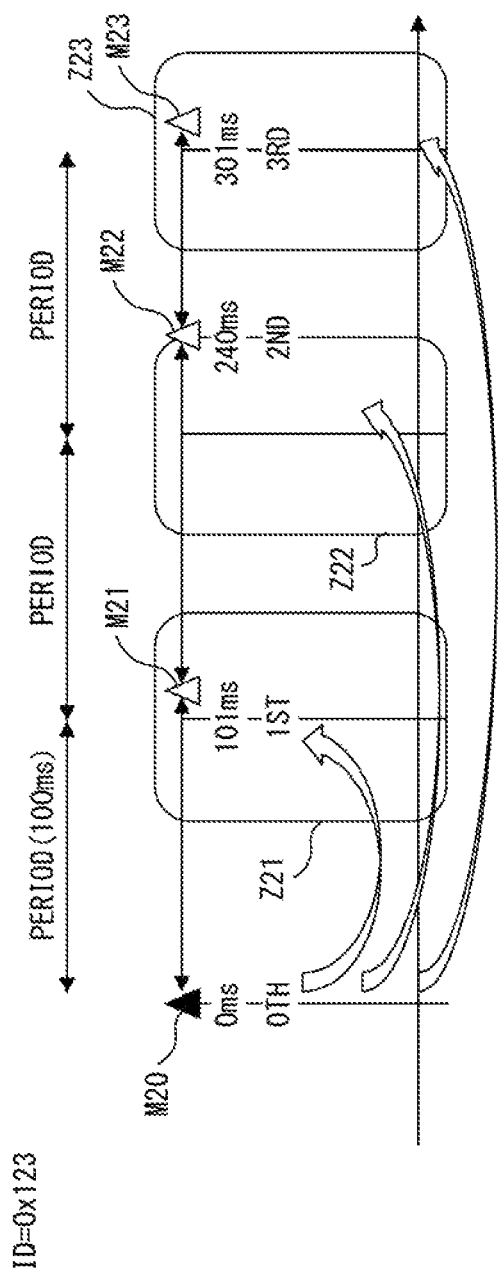
FIG. 8 is a diagram explaining an example of an attack detection method according to the first embodiment.

FIG. 8 is a diagram explaining an example of an attack detection method according to the first embodiment. Note that in FIG. 8, an example of a case in which an attack has not been conducted is explained. In the example of FIG. 8, the attack detection device 10 stores information provided in FIG. 7 and monitors an attack on periodic messages with ID=0x123.

Assume that the transmission/reception unit 11 of the attack detection unit 10 received a periodic message M20 at 0 ms. When no messages with ID=0x123 have been received, the reference update processing unit 23 records the periodic message M20 in the reception condition information 32 as a reference message with ID=0x123 and records the reception time of the periodic message M20 as the reference time 33. The calculation unit 21 generates the reception prediction 34 (FIG. 7) of the periodic messages with ID=0x123 in accordance with the processing explained with reference to FIG. 7.

Next, assume that the transmission/reception unit 11 received a periodic message M21 with ID=0x123 at 101 ms. Because the ID of the periodic message M21 is 0x123, the determination unit 22 determines that the periodic message M21 is the first message with ID=0x123 counted from the reference message. The determination unit 22 records the reception time of the periodic message M21 in the reception condition information 32. In addition, the determination unit 22 determines whether the reception time of the periodic message M21 is within the reception range of a case in which the order of reception included in the reception prediction 34 is 1. Here, the reception range of the first message counted from the reference message is 60 ms to 140 ms as indicated as a range Z21 in FIG. 8. The determination unit 22 determines that the reception time of the periodic message M21 is 101 ms, which is within the range Z21. The determination unit 22, accordingly, determines that an attack has not been detected.

Assume that at 240 ms, the transmission/reception unit 11 received a periodic message M22 with ID=0x123. Because the ID of the periodic message M22 is 0x123, the determination unit 22 determines that the periodic message M22 is the second message with ID=0x123 counted from the reference message. The determination unit 22 records the reception time of the periodic message M22 in the reception condition information 32. In addition, the determination unit 22 determines whether the reception time of the periodic message M22 is within 160 ms to 240 ms (a range Z22 in FIG. 8), which is the reception range of a case in which the order of reception included in the reception prediction 34 is 2. Here, because the reception time of the periodic message M22 is 240 ms, the determination unit 22 determines that the second periodic message M22 counted from the reference message was received within the range Z22. The determination unit 22, accordingly, determines that an attack has not been detected.

Assume that at 301 ms, the transmission/reception unit 11 received a periodic message M23 with ID=0x123. Because the ID of the periodic message M23 is 0x123, the determination unit 22 determines that the periodic message M23 is the third message with ID=0x123 counted from the reference message. The determination unit 22 records the reception time of the periodic message M23 in the reception condition information 32. For that reason, the attack detection device 10 stores the reception condition information 32 provided in FIG. 8 at a point in time at which the periodic message M23 is received. In addition, the determination unit 22 determines whether the reception time of the periodic message M23 is within 260 ms to 340 ms (a range Z23 in FIG. 8), which is the reception range of a case in which the order of reception included in the reception prediction 34 is 3. Here, because the reception time of the periodic message M23 is 301 ms, the determination unit 22 determines that the third periodic message M23 counted from the reference message was received within the range Z23. The determination unit 22, accordingly, determines that an attack has not been detected.

Figure 9:
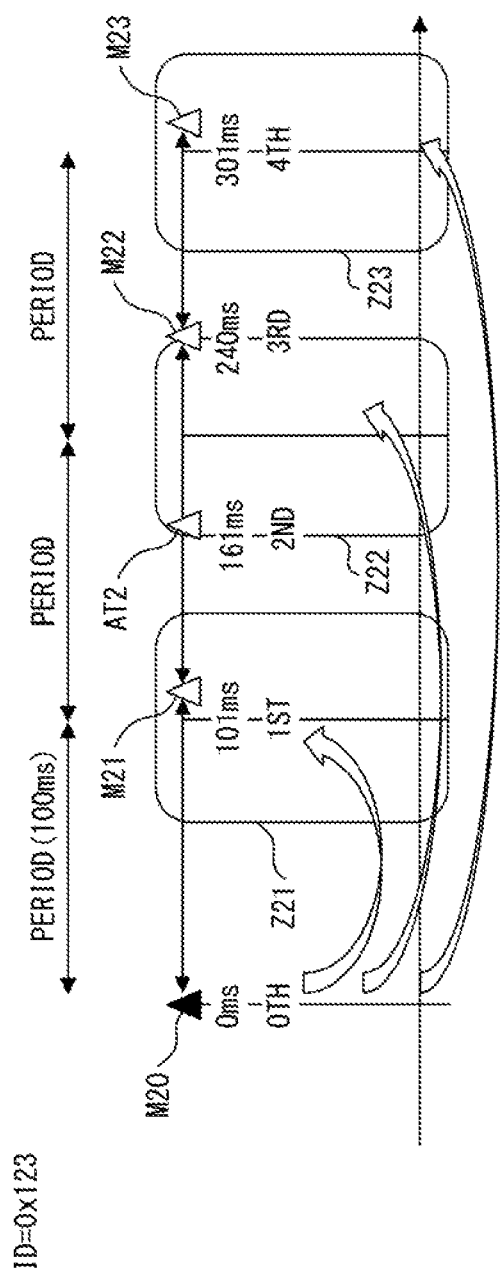
FIG. 9 is a diagram explaining an example of attack detection.

FIG. 9 is a diagram explaining an example of attack detection. In the example of FIG. 9, similarly, the attack detection device 10 stores information provided in FIG. 7 and monitors an attack on periodic messages with ID=0x123. In the example in FIG. 9, the attack detection device 10 receives a periodic message M20 at 0 ms and sets the periodic message M20 as a reference message with ID=0x123.

Next, assume that the transmission/reception unit 11 received a periodic message M21 with ID=0x123 at 101 ms. Then processing similar to the processing explained with reference to FIG. 8 as processing when the periodic message M21 is received is conducted, and the determination unit 22 determines that an attack has not been detected.

Assume that at 161 ms, the transmission/reception unit 22 received a message AT2 with ID=0x123. The message AT2 is an attack using ID=0x123. Because the ID of the message AT2 is 0x123, the determination unit 22 determines that the message AT2 is the second message with ID=0x123 counted from the reference message. The determination unit 22 records the reception time of the message AT2 in the reception condition information 32. In addition, the determination unit 22 determines whether the reception time of the message AT2 is within the 160 ms to 240 ms (a range Z22 in FIG. 9) that is the reception range of a case in which the order of reception included in the reception prediction 34 is 2. Here, because the reception time of the message AT2 is 161 ms, the determination unit 22 determines that the second message AT2 counted from the reference message was received within the range Z22. The determination unit 22, accordingly, determines that an attack has not been detected.

Assume that at 240 ms, the transmission/reception unit 11 received a periodic message M22 with ID=0x123. Because the ID of the periodic message M22 is 0x123, the determination unit 22 determines that the periodic message M22 is the third message with ID=0x123 counted from the reference message. The determination unit 22 records the reception time of the periodic message M22 in the reception condition information 32. The determination unit 22 determines whether the reception time of the periodic message M22 is within the 260 ms to 340 ms (a range Z23 in FIG. 9) that is the reception range of a case in which the order of reception included in the reception prediction 34 is 3. Here, the reception time of the periodic message M22 is 240 ms, and the determination unit 22 determines that the third periodic message M22 counted from the reference message is not within the reception range Z23. The determination unit 22, accordingly, determines that an attack has been detected.

Figure 10:
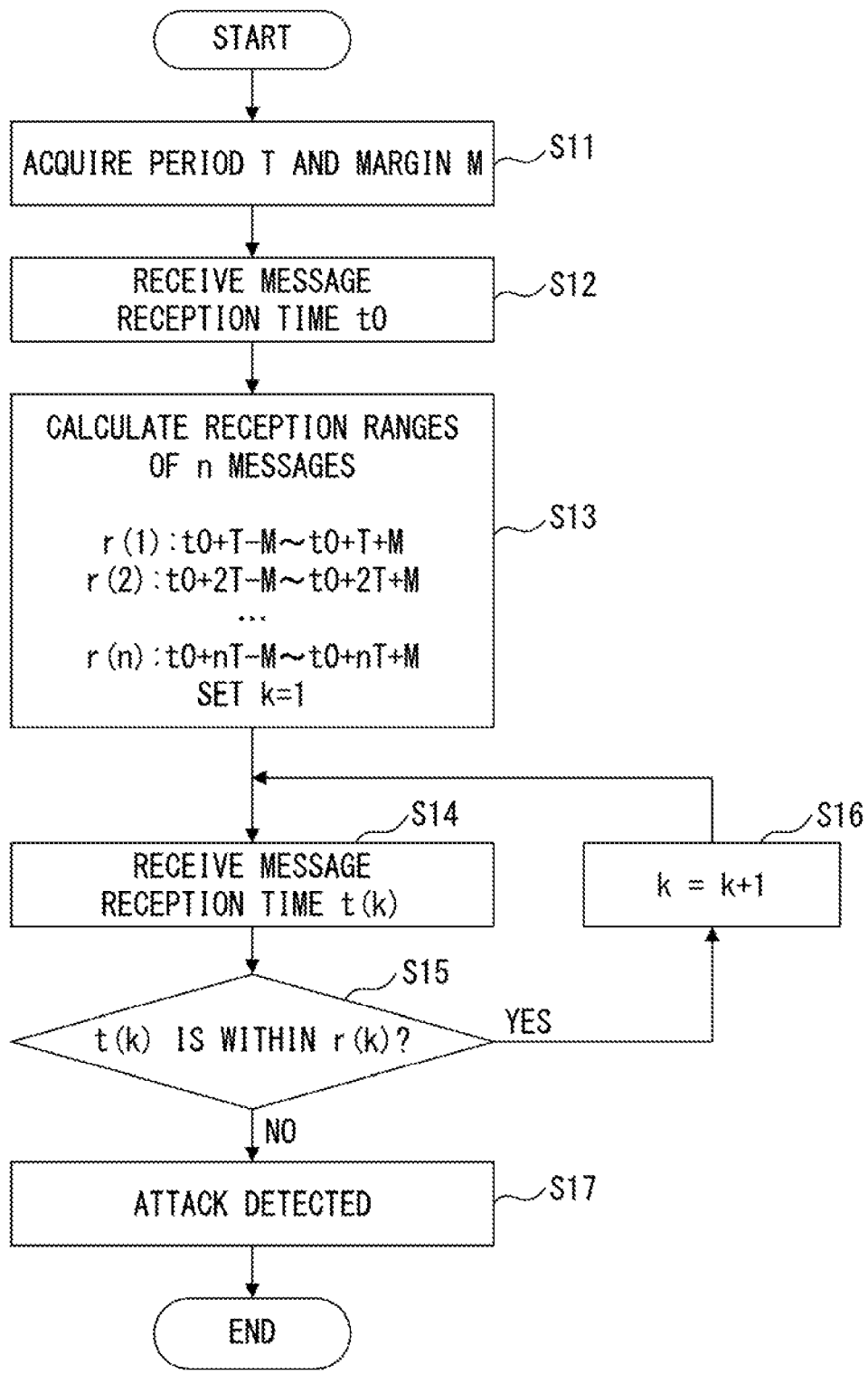
FIG. 10 is a flowchart explaining an example of the processing of the attack detection device.

FIG. 10 is a flowchart explaining an example of the processing of the attack detection device 10. The calculation unit 21 acquires a transmission period T and a margin M of an ID of an attack detection target from the transmission condition (step S11). When the transmission/reception unit 11 receives the first periodic message of the attack detection target ID, the reference update processing unit 23 acquires the reception time t0 of the message (step S12). The reference update processing unit 23 stores the reception time t0 of the message as the reference time 33. The calculation unit 21 calculates reception ranges of n messages (r(1) to r(n)) by using the information acquired in step S11 and the reception time t0, and sets a variable k to 1 (step S13).

Next, when the transmission/reception unit 11 receives a message with the attack detection target ID, the determination unit 22 sets the reception time of the message to t(k) (step S14). The determination unit 22 determines whether the reception time t (k) is within r (k) (step S15). When the reception time t (k) is within r (k), the determination unit 22 does not detect an attack based on the kth message (Yes in step S15). Then, the determination unit 22 increments the variable k by 1 and the processing returns to step S14 (step S16).

On the other hand, when the reception time t(k) is not within r(k), the determination unit 22 detects an attack (No in step S15, step S17).

Note that the determination unit 22 does not specify which message is the message transmitted as an attack, but does detect that an attack was conducted. In other words, when a frame used for an attack is mixed in periodic messages, the order of reception of the received periodic messages counted from a reference message is different from the order of reception obtained when a frame used for an attack is not mixed in periodic messages. Here, in the calculation of the reception prediction 34, when a frame used for an attack is not included, the reception prediction 34 is obtained by associating the reception range of each of periodic messages with the order of reception of the periodic message counted from the reference message. When a frame used for an attack is mixed, after the attack is conducted, the order of reception of a periodic message counted from the reference message is different from the order of reception of a case in which an attack has not been conducted. For that reason, the reception time of a periodic message is not within a reception range corresponding to the order of reception of the periodic message, and as a result, the determination unit 22 can detect the attack.

Figure 11:
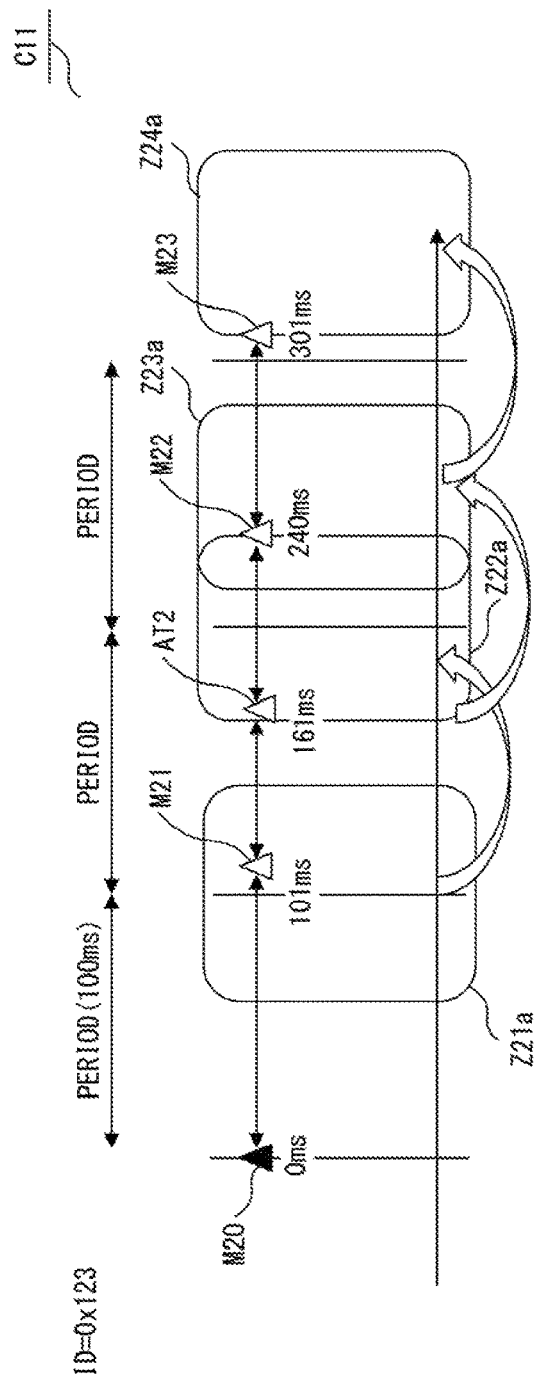
FIG. 11 is a diagram explaining an example of comparison between the attack detection method according to the first embodiment and another detection method.
Figure 11:
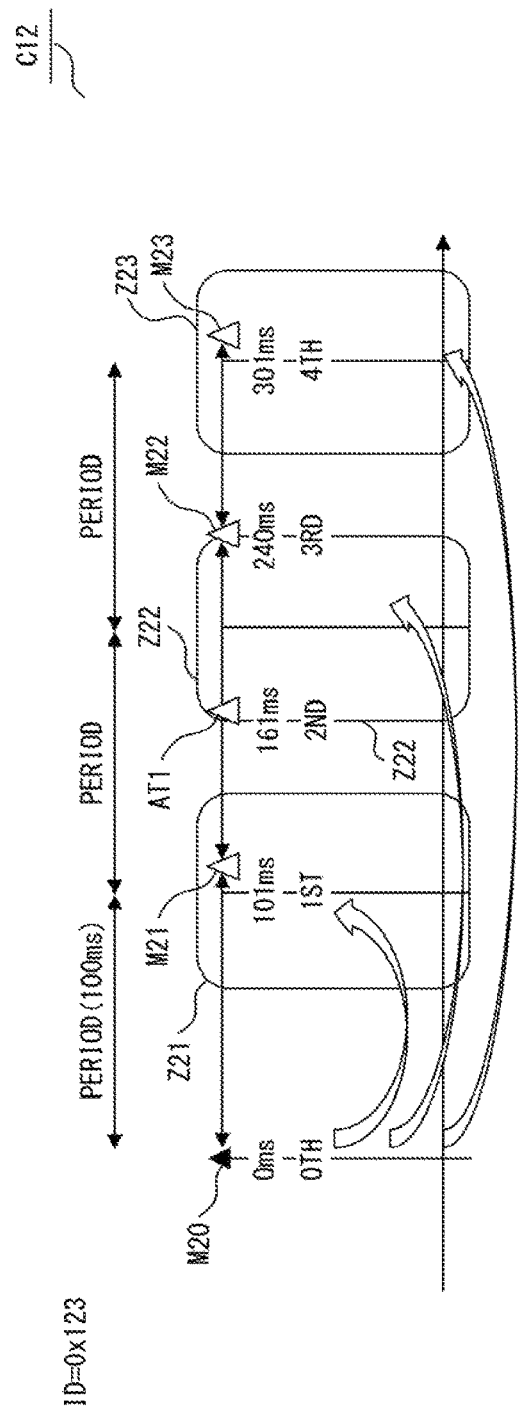

FIG. 11 is a diagram explaining an example of comparison between the attack detection method according to the first embodiment and another detection method. A case C12 is an example of processing with the attack detection method according to the first embodiment and a case C11 is an example processing with another attack detection method that is to be compared with the attack detection method according to the first embodiment. Assume that in both of the cases C11 and C12, a periodic message M20, a periodic message M21, an attacking frame AT2, a periodic message M22 and a periodic message 23 are transmitted as frames with ID=0x123. Moreover, in both of the cases, these frames are received at the following timings.

Periodic message M20: 0 ms
Periodic message M21: 101 ms
Attacking frame AT2: 161 ms
Periodic message M22: 240 ms
Periodic message M23: 301 ms In both of the cases, furthermore, the transmission period is set to be 100 ms and the margin is set to be 40 ms.

Assume that in the case C11, when the interval between the reception times of two frames is equal to or shorter than the transmission period±the margin, a determination is made such that an attack has not been conducted. The transmission period±the margin is 60 ms to 140 ms. When a device that executes detection processing receives the periodic message M21 because the message was received 101 ms after the reception of the periodic message M20 and because 60 ms<101 ms<140 ms, the device determines that an attack has not been conducted. When the device that executes detection processing receives the attacking frame AT2, because the attacking frame AT2 was received 60 ms after the reception of the periodic message M21 and because 60 ms≤60 ms≤140 ms, the device determines that an attack has not been conducted. When the device that executes detection processing receives the periodic message M22, because the periodic message M22 was received 79 ms after the reception of the attacking frame AT2 and because 60 ms<79 ms<140 ms, the device determines that an attack has not been conducted. When the device that executes detection processing receives the periodic message M23, because the periodic message M23 was received 61 ms after the reception of the periodic message M22 and because 60 ms<61 ms<140 ms, the device determines that an attack has not been conducted. As described above, with the detection method of the case C11, because of its wide margin, an attack using the attacking frame AT2 would be overlooked.

In the attack detection method according to the first embodiment, as in the case C12, the periodic message M20 is set to be a reference message and the subsequent reception ranges are predicted. For that reason, as explained with reference to FIG. 9, a range Z21 is calculated as a reception range of the first message counted from the reference message, a range Z22 is calculated as a reception range of the second message counted from the reference message, and a range Z23 is calculated as a reception range of the third message counted from the reference message. Then, because the attacking frame AT2 is handled as the second message counted from the reference message and because the attacking frame AT2 is received in the range Z22, the attack detection device 10 does not detect an attack at the point in time at which the attacking frame AT2 is received. However, as a result of the reception of the attacking frame AT2, the periodic message M22 is handled as the third message counted from the reference message. Therefore, the reception time of the periodic message M22 is compared with the Z23 that is the reception range of the third message counted from the reference message. However, the reception time of the periodic message M22 is not within the range Z23. Consequently, the attack detection device 10 can determine that an attack using a frame with ID=0x123 has been conducted.

As described above, the attack detection device 10 calculates a reception range of each of plural messages counted from a message of reference and determines whether the reception time of each of the received messages is within the reception range associated with the order of reception of the received messages counted from the reference message. For that reason, even with a wide margin, the attack detection device 10 can detect that an attack has been conducted.

Second Embodiment

In the second embodiment, an example of a case in which the reference update processing unit 23 changes a reference message on a regular basis is explained.

Figure 12:
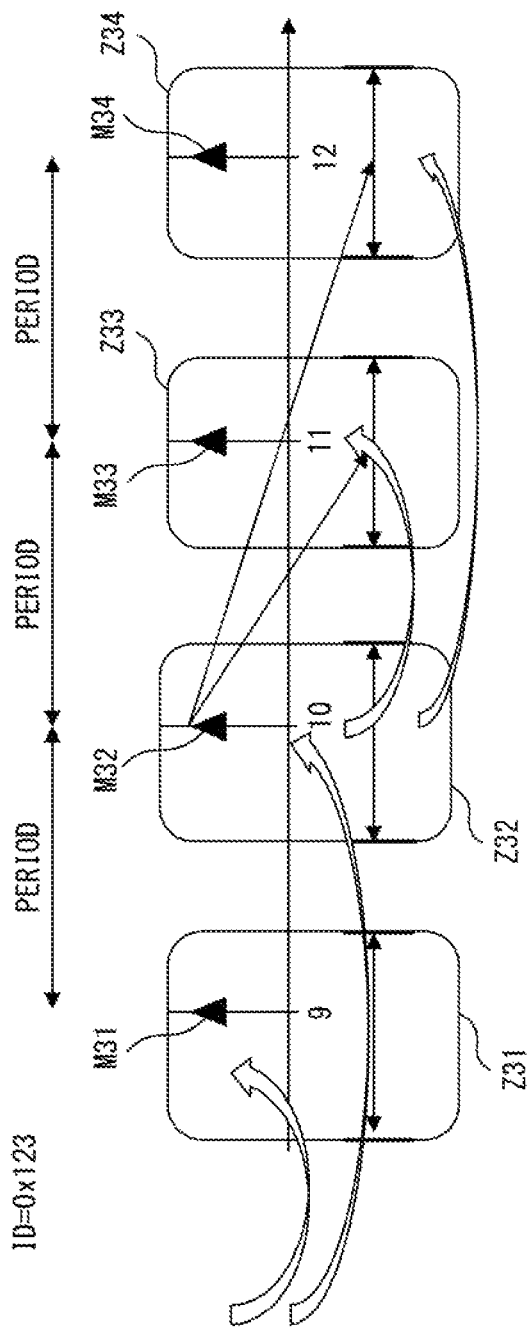
FIG. 12 is a diagram explaining an example of the attack detection method according to the second embodiment.

FIG. 12 is a diagram explaining an example of the attack detection method according to the second embodiment. FIG. 12 illustrates an example in which a reception range for each of up to 10 messages counted from any one reference message is predicted and the 10th message counted from the reference message is set to be a new reference message.

With a periodic message of reference, the calculation unit 21 calculates a reception range for each of the first to the 10th messages. At that time, the calculation method in the calculation unit 21 is the same as the calculation explained with reference to FIG. 8. FIG. 12 illustrates a situation in which the 9th message and the subsequent messages counted from a reference message are received. The 9th message counted from the reference message is M31. The calculation unit 21 calculates Z31 as a reception range of the 9th message counted from the reference message. Similarly, the calculation unit 21 calculates Z32 as a reception range of the 10th message counted from the reference message.

Every time a message is received by the transmission/reception unit 11, with respect to each ID, the reference update processing unit 23 counts how many messages have been received since the reception of the reference message and finds out which message the received message is. When reception of the periodic message M32 that is the 10th message counted from the reference message is detected, the reference update processing unit 23 sets the 10th message to be a new reference message and updates the reference time 33 with the reception time of the periodic message M32.

When the reference time 33 is updated, the calculation unit 21 calculates the predetermined number of reception ranges by using the new reference time 33. Accordingly, in the example of FIG. 12, the calculation unit 21 calculates reception ranges of messages up to the 10th message counted from the periodic message M32. Assume that, as an example, the calculation unit 21 calculates a reception range of the first message counted from the periodic message M32 that is a new reference message as a range Z33 and a reception range of the second message counted from the periodic message M32 as a range Z34.

Meanwhile, a new periodic message M33 is received by the transmission/reception unit 11. The determination unit 22 takes the periodic message M33 as the first message counted from the periodic message M32 that is a new reference message and determines whether the reception time is within the range Z33. In the example of FIG. 12, because the reception time of the periodic message M33 is within the range Z33, an attack is not detected at a point in time at which the periodic message M33 is received. Next, a periodic message M34 is received by the transmission/reception unit 11. The determination unit 22 takes the periodic message M34 as the second message counted from the periodic message M32 that is a new reference message and determines whether the reception time is within the range Z34. In the example of FIG. 12, because the reception time of the periodic message M34 is within the range Z34, an attack is not detected at a point in time at which the periodic message M34 is received. The same processing is executed afterward.

Figure 13:
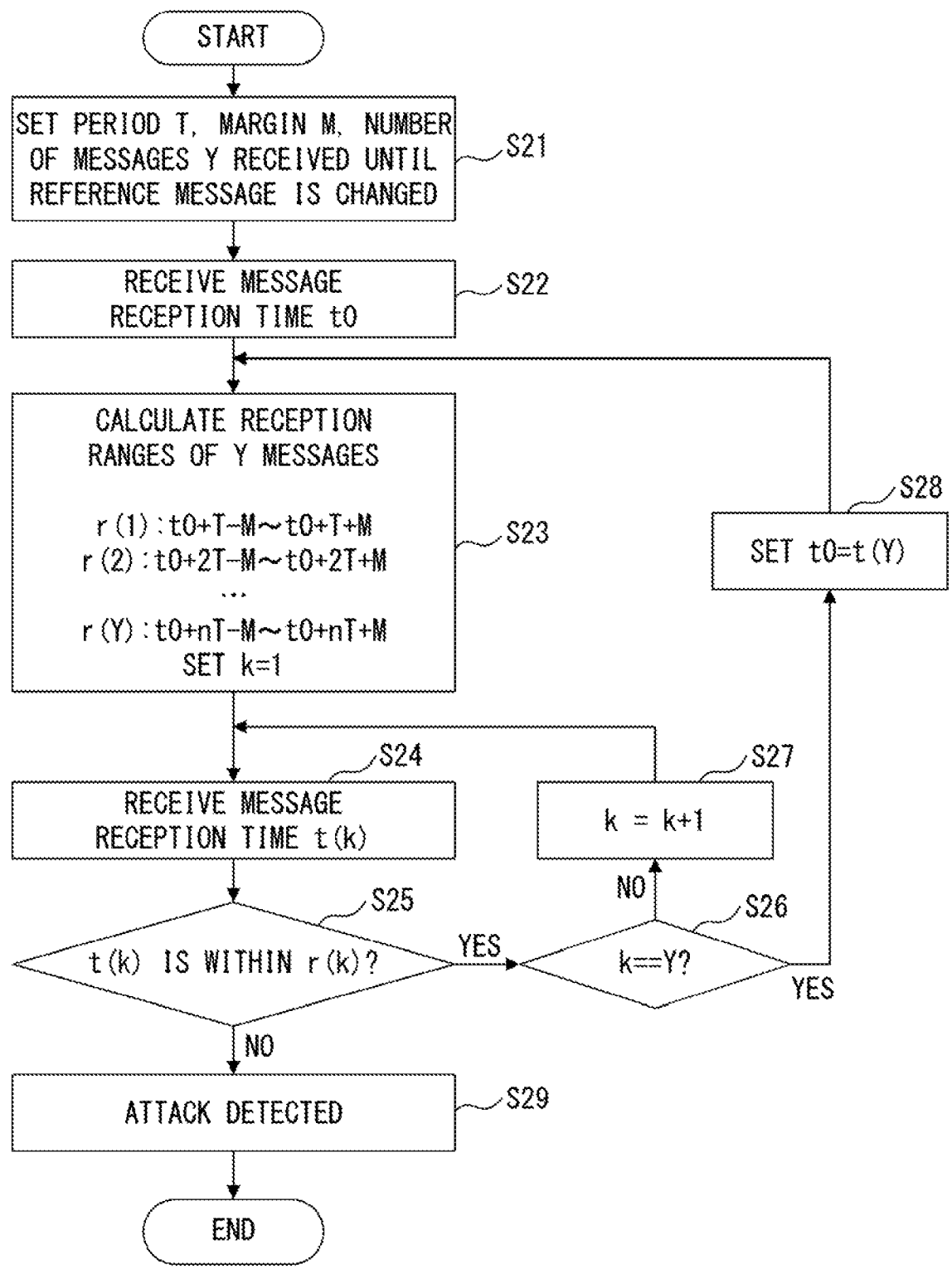
FIG. 13 is a flowchart explaining an example of the processing of the attack detection device.

FIG. 13 is a flowchart explaining an example of the processing of the attack detection device 10. The calculation unit 21 reads a transmission period T and a margin M of the attack detection target ID from the transmission condition 31 and sets the number of messages Y to be received until a reference message is changed (step S21). When the transmission/reception unit 11 receives the first periodic message of the attack detection target ID, the reference update processing unit 23 acquires the reception time t0 of the message (step S22). The reference update processing unit 23 stores the reception time t0 of the message as the reference time 33. The calculation unit 21 calculates reception ranges of Y messages (r(1) to r(Y)) by using the information acquired in step S21 and the reception time t0, and sets a variable k to 1 (step S23).

Next, when the transmission/reception unit 11 receives a message with the attack detection target ID, the determination unit 22 sets the reception time of the message to t(k) (step S24). The determination unit 22 determines whether the reception time t (k) is within r (k) (step S25). When the reception time t (k) is within r (k), the determination unit 22 does not detect an attack based on the kth message (Yes in step S25). Then, the determination unit 22 determines whether the variable k is equal to Y (step S26). When the variable k is not equal to Y, the attack detection device 10 has not yet received Y messages (No in step S26). The determination unit 22 increments the variable k by 1 and the processing returns to step S24 (step S27).

On the other hand, when the variable k is equal to Y, the attack detection device 10 has received Y messages (Yes in step S26). Then the reference update processing unit 23 sets the reception time t (Y) of the Yth message to the reception time t0 of a new reference message and the processing returns to step S23 (step S28).

In the second embodiment as well as the first embodiment, when the reception time t(k) is not within r(k), the determination unit 22 detects an attack (No in step S25, step S29).

As described above, in the second embodiment, reference messages are changed on a regular basis. Accordingly, errors can be reduced to a prescribed number or less. For example, even in a case in which a transmission period of messages is on the order of microseconds while the time measurement is executed on the order of milliseconds in the attack detection device 10, it is possible to prevent errors from being accumulated to exceed a prescribed amount. Therefore, attacks being overlooked or false detections that are caused by accumulation of errors can be prevented.

Third Embodiment

In the third embodiment, in a case in which a reception range of one of the second and the subsequent messages is predicted and a starting point of calculation of a reception range is changed for each message, processing is explained.

Figure 14:
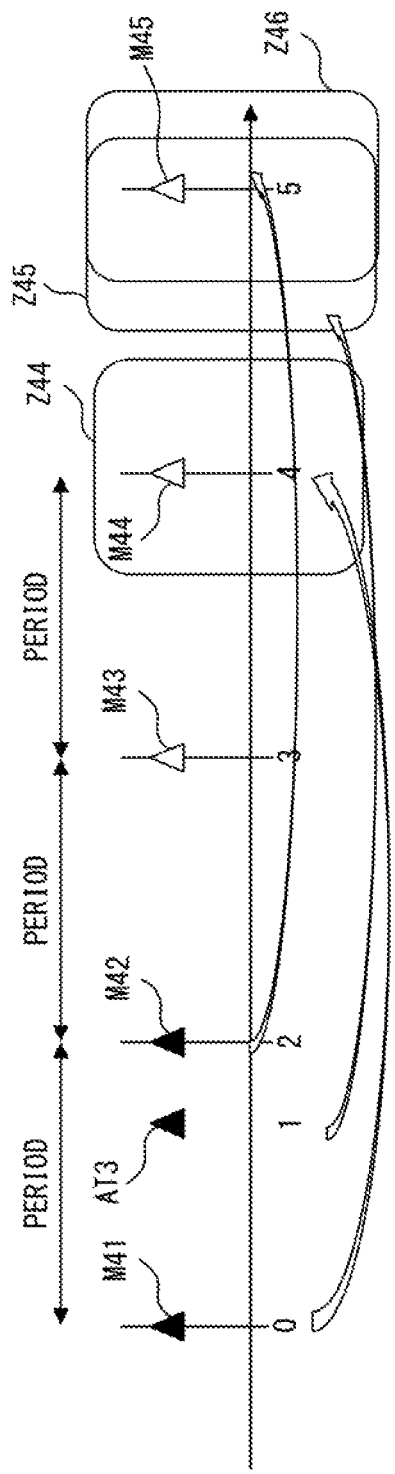
FIG. 14 is a diagram explaining an example of the attack detection method according to the third embodiment.

FIG. 14 is a diagram explaining an example of the attack detection method according to the third embodiment. In the example of FIG. 14, an example is explained of a case of predicting a reception range of a periodic message expected to be received third from a received message among the messages with the same ID as that of the received message. Note that in FIG. 14, a periodic message M41 is set as a reference message.

When the transmission/reception unit 11 receives the periodic message M41, the calculation unit 21 calculates a reception range of a periodic message expected to be received third from the periodic message M41. The calculation method of the reception range is the same as that of the first embodiment. The example of FIG. 14 assumes that the calculation unit 21 calculate Z44 as a reception range of a periodic message expected to be received third from the periodic message M41. The calculation unit 21 records the calculation result as the reception prediction 34. At that time, Z44 is recorded as a reception prediction of a message expected to be received third from the reference message. Meanwhile, the determination unit 22 does not conduct the determination processing because the reception prediction used for determination of the periodic message M41 is not obtained.

Next, assume that the transmission/reception unit 11 received an attacking frame AT3. In this case, because the attacking frame AT3 includes a processing target ID, the attacking frame AT3 is handled as the first periodic message counted from a reference frame. The reference frame is also referred to as the reference massage. The calculation unit 21 calculates Z45 as a reception range of a periodic message expected to be received third in the order of reception counted from the attacking frame AT3 and records Z45 in the reception prediction 34. At that time, Z45 is recorded as a reception prediction of the fourth message counted from the reference message. In this case also, the determination unit 22 does not conduct the determination processing because a reception prediction used for determination of the attacking frame AT3 is not obtained.

Thereafter, assume that the transmission/reception unit 11 receives a periodic message M42. Because the attacking frame AT3 is received by the attack detection device 10 after the reference frame was received, the periodic message M42 is handled as the second periodic message counted from the reference frame. The calculation unit 21 calculates Z46 as a reception range of a periodic message expected to be received third in the order of reception counted from the periodic message M42 and records Z46 in the reception prediction 34. The reception range (Z46) calculated on the basis of the periodic message M42 is recorded as a reception prediction of the fifth message counted from the reference message because the periodic message M42 is handled as the second periodic message counted from the reference frame. The determination unit 22 does not conduct the determination processing because a reception prediction used for determination of the periodic message M42 is not obtained.

The transmission/reception unit 11 receives a periodic message M43. Here, because each of the periodic message M41, the attacking frame AT3, the periodic message M42, and the periodic message M43 includes the attack detection target ID, the determination unit 22 handles the periodic message M43 as the third periodic message counted from the reference message. Consequently, the determination unit 22 determines whether the reception time of the periodic message M43 is within the range Z44. In the example of FIG. 14, because the reception time of the periodic message M43 is not within the range Z44, the determination unit 22 can detect an attack.

Figure 15:
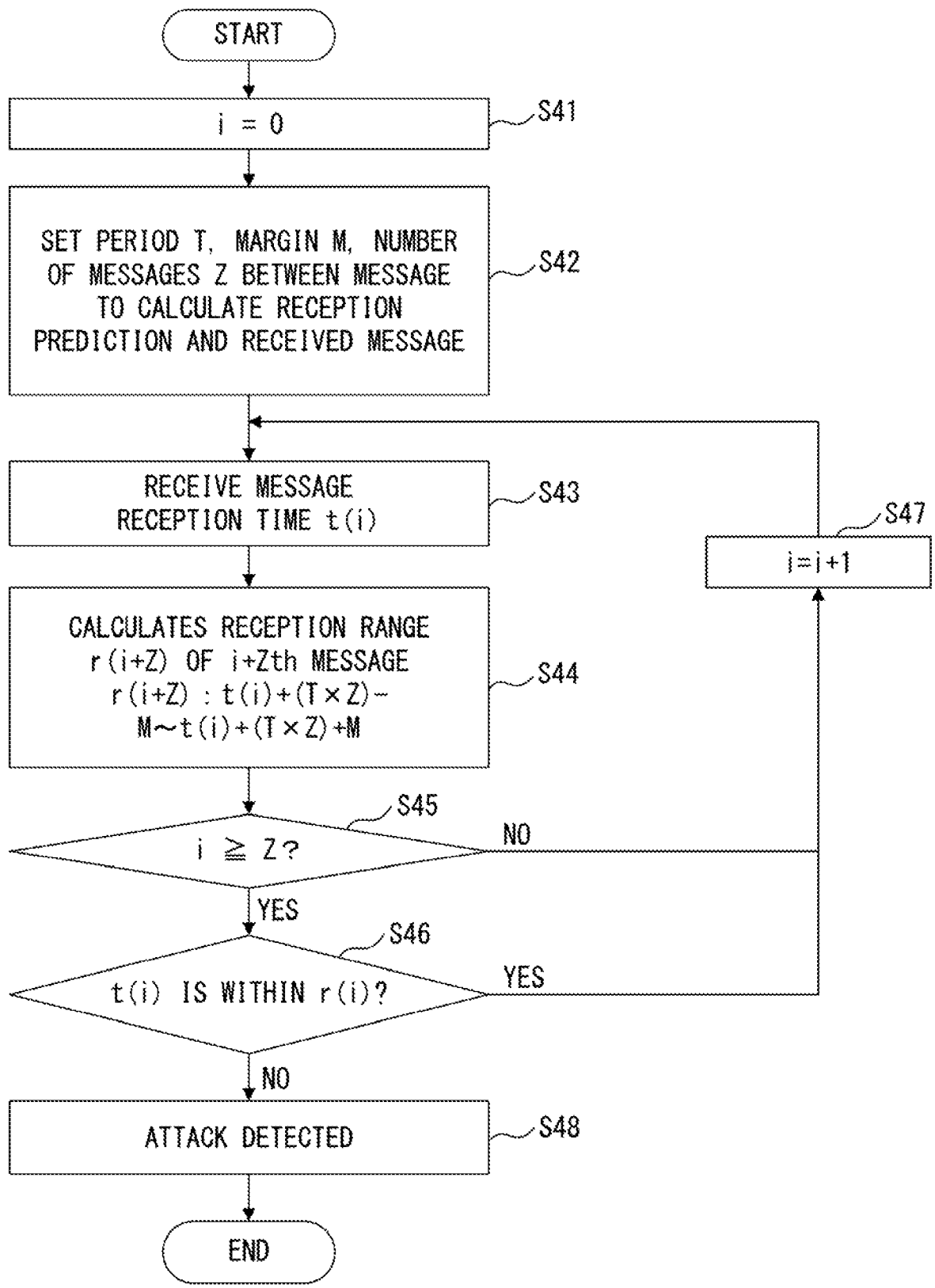
FIG. 15 is a flowchart explaining an example of the processing of the attack detection device.

FIG. 15 is a flowchart explaining an example of the processing of the attack detection device 10. The calculation unit 21 sets a variable i to 0 (step S41). Regarding messages with a processing target ID, the calculation unit 21 sets a transmission period, a margin, and a number of messages Z that is the number of the message from a received message to the message for calculating a reception prediction by using the transmission condition 31 (step S42). When a message is received by the transmission/reception unit 11, the calculation unit 21 sets the reception time of the message to t(i) (step S43). The calculation unit 21 calculates a reception range r(i+Z) of the i+Zth message (step S44). In step S44, r(i+Z) is a range from t(i)+(T×Z)−M to t(i)+(T×Z)+M.

The determination unit 22 determines whether the variable i is Z or larger (step S45). When the variable i is less than Z, the determination unit 22 increments the variable i by 1 and the processing returns to step S43 (No in step S45, step S47).

When the variable i is equal to or larger than Z, the determination unit 22 determines whether t(i) is within the reception range r(i) (Yes in step S45, step S46). When t(i) is within the reception range r(i), the determination unit 22 increments the variable i by 1 and the processing returns to step S43 (Yes in step S46, step S47). On the other hand, when t (i) is not within the reception range r(i), the determination unit 22 detects that an attack has been conducted (No in step S46, step S48).

In the third embodiment, there are Y messages that are the starting point of calculation of a reception range, and a message that is the starting point of calculation of a reception range is updated every time a message is received. Accordingly, like the second embodiment, errors can be reduced to a prescribed number or less in the third embodiment.

Fourth Embodiment

In the fourth embodiment, in a case in which a reception range of a message received after reception of a prescribed number of messages counted from a reference message is predicted in the calculation unit 21 and a reception range of a message next to the reference message is not calculated, processing is explained.

Figure 16:
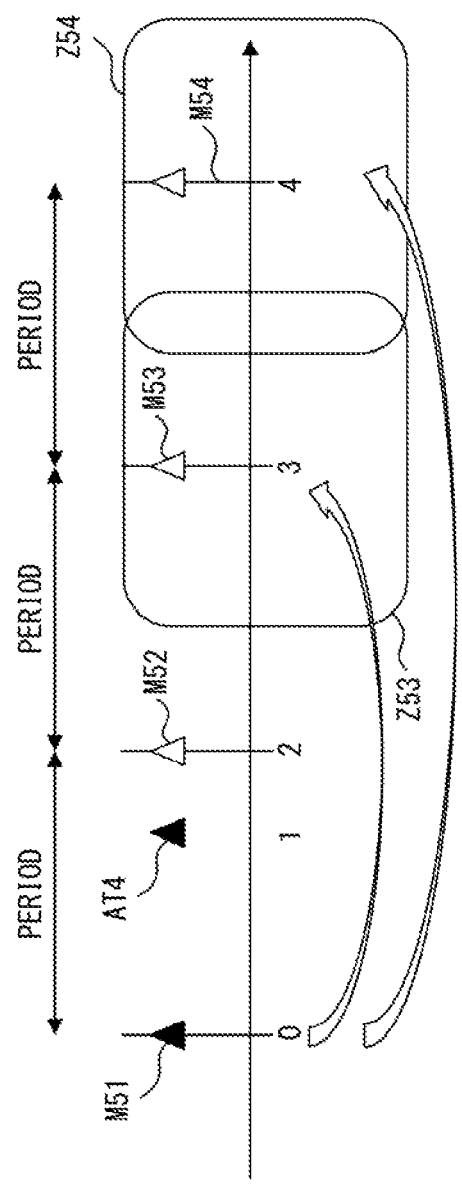
FIG. 16 is a diagram explaining an example of the attack detection method according to the fourth embodiment.

FIG. 16 is a diagram explaining an example of the attack detection method according to the fourth embodiment. When the transmission/reception unit 11 receives a periodic message M51, the calculation unit 21 determines the periodic message M51 to be a reference message.

The calculation unit 21 calculates the reception ranges of the second and the subsequent periodic messages counted from the periodic message M51. The calculation method of the reception range is the same as that of the first embodiment. In the example of FIG. 16, assume that the calculation unit 21 calculates Z53 as a reception range of the second periodic message counted from the periodic message M51 and calculates Z54 as a reception range of the third periodic message counted from the periodic message M51. The calculation unit 21 records the calculation result as the reception prediction 34. At that time, Z53 is recorded as a reception range of the second message counted from the reference message and Z54 is recorded as a reception range of the third message counted from the reference message. Meanwhile, the determination unit 22 does not conduct the determination processing because a reception range used for determination of the periodic message M51 is not obtained.

Next, assume that the transmission/reception unit 11 received an attacking frame AT4. Because the attacking frame AT4 includes a processing target ID, the determination unit 22 handles the attacking frame AT4 as the first periodic message counted from the reference message M51. In this case also, the determination unit 22 does not conduct the determination processing because a reception range used for determination of the attacking frame AT4 is not obtained.

Assume that the transmission/reception unit 11 afterwards received a periodic message M52. Because the periodic message M52 includes a processing target ID, the determination unit 22 handles the periodic message M52 as the second periodic message counted from the reference message M51. By using the reception prediction 34, the determination unit 22 acquires the range indicated as Z53 as the range predicted to receive the second periodic message counted from the reference message M51. Here, the reception time of the periodic message M52 determined to be the second periodic message counted from the reference message M51 is not within the range indicated as Z53. Consequently, the determination unit 22 can detect that an attack has been conducted.

As explained above, in the fourth embodiment, a reception range of a periodic message next to a reference message is not calculated. For that reason, compared with the first embodiment, a processing load on the calculation unit 21 is reduced in the fourth embodiment. In addition, compared with the first embodiment, memory capacity to store the reception prediction 34 can be reduced.

Fifth Embodiment

In the fifth embodiment, an explanation is given about a case in which the starting time of a reception range of each of periodic messages is calculated, but the ending time of the reception range is not set.

Figure 17:
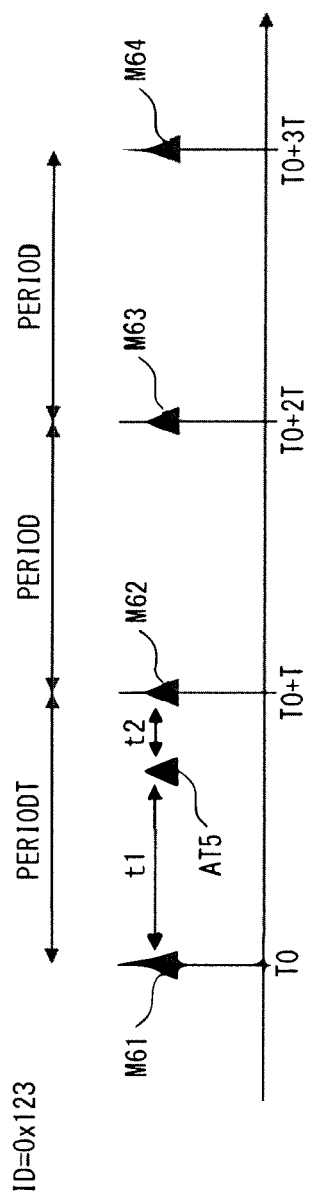
FIG. 17 is a diagram explaining an example of the attack detection method according to the fifth embodiment.

FIG. 17 is a diagram explaining an example of the attack detection method according to the fifth embodiment. When the transmission/reception unit 11 receives a periodic message M61, the calculation unit 21 determines the periodic message M61 to be a reference message.

The calculation unit 21 calculates the starting time of a reception range of periodic messages received subsequent to the periodic message M61. The starting time Ts(n) of the reception range of the n-th periodic message is calculated by the following equation.

$$Ts(n)=T0+n\times T-M$$

Here, T0 is the reception time of a reference message, T is a transmission period of the periodic messages, and M is a margin.

In FIG. 17, vertical lines are provided to indicate T0+n×T where n=1 to 3 in order to make the diagram more visible. In the case of FIG. 17, when the n-th message of messages with ID=0x123 counted from a reference message is received at T0+n×T−M or after, the determination unit 22 determines that an attack has not been conducted by the messages up to the n-th message from the reference message.

In the following description, a case in which n=2 is explained as an example. Assume that the calculation unit 21 received an attacking frame AT5 next to a periodic message M61 at T0+t1. Here, the attacking frame AT5 includes ID=0x123. The determination unit 22 then handles the attacking frame AT5 as the first periodic message with ID=0x123 counted from the reference message. At that time, the determination unit 22 does not determine whether an attack has been conducted because the n-th message with ID=0x123 counted from the reference message has not yet been received.

Next, assume that a periodic message M62 is received after t2 from reception of the attacking frame AT5. In this case, because the attacking frame AT5 and the periodic message M62, both of which are with ID=0x123, have been received after the reference frame M61, the determination unit 22 handles the periodic message M62 as the second periodic message counted from the reference frame M61. For that reason, the determination unit 22 determines whether the reception time of the periodic message M62 is T0+n×T−M, which is the starting time of the reception range of the second periodic message, or after. In the example of FIG. 17, the reception time of the periodic message M62 is T0+T, which is before the starting time (T0+2T−M) of the reception range of the second periodic message. Therefore, at the time at which the periodic message M62 is received, the determination unit 22 determines that an attack has been conducted at some point up until now. Note that in FIG. 17, a case where n=2 is explained as an example, but this is merely an example. In other words, n can be any integer that is equal to 2 or larger.

Figure 18:
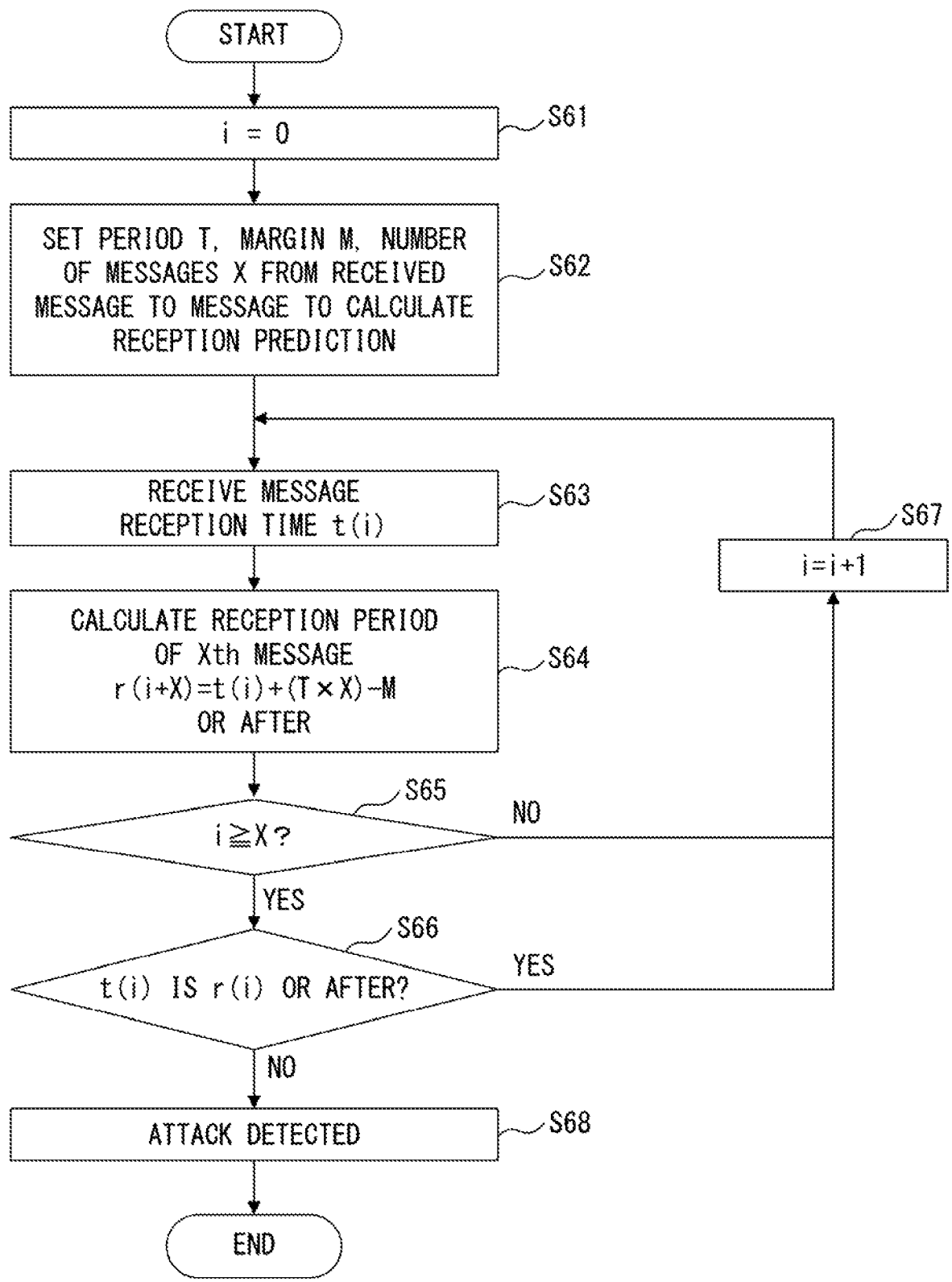
FIG. 18 is a flowchart explaining an example of the processing of the attack detection device.

FIG. 18 is a flowchart explaining an example of the processing of the attack detection device 10. The calculation unit 21 sets a variable i to 0 (step S61). Regarding messages with a processing target ID, the calculation unit 21 sets a transmission period T, a margin M, and a number X that is the number of messages from a received message to the message for calculating a reception prediction by using the transmission condition 31 (step S62). When a message is received by the transmission/reception unit 11, the calculation unit 21 sets the reception time of the message to t (i) (step S63). The calculation unit 21 calculates the starting time r(i+X) of a reception range of the Xth message to be received after the received message (step S64). In step S64, the calculation uses an equation r(i+X)=t(i)+(T×X)−M.

The determination unit 22 determines whether the variable i is X or larger (step S65). When the variable i is less than X, the determination unit 22 increments the variable i by 1 and the processing returns to step S63 (No in step S65, step S67).

When the variable i is equal to or larger than X, the determination unit 22 determines whether t(i) is the starting time r(i) of the reception range or after (Yes in step S65, step S66). When t (i) is the starting time r (i) of the reception range or after, the determination unit 22 increments the variable i by 1 and the processing returns to step S63 (Yes in step S66, step S67). On the other hand, when t(i) is not the starting time r(i) of the reception range or after, the determination unit 22 detects that an attack has been conducted (No in step S66, step S68).

In the fifth embodiment, although the starting time of a reception range of a message received after a reference message is calculated, the ending time is not calculated. For that reason, compared with the first embodiment, a processing load on the calculation unit 21 is reduced in the fifth embodiment. In addition, compared with the first embodiment, memory capacity to store the reception prediction 34 can be reduced.

Sixth Embodiment

As the sixth embodiment, an embodiment is explained in which even when the reception time of a message is not within a reception range associated with the order of reception, the order of reception counted from a reference message is not incremented.

Figure 19:
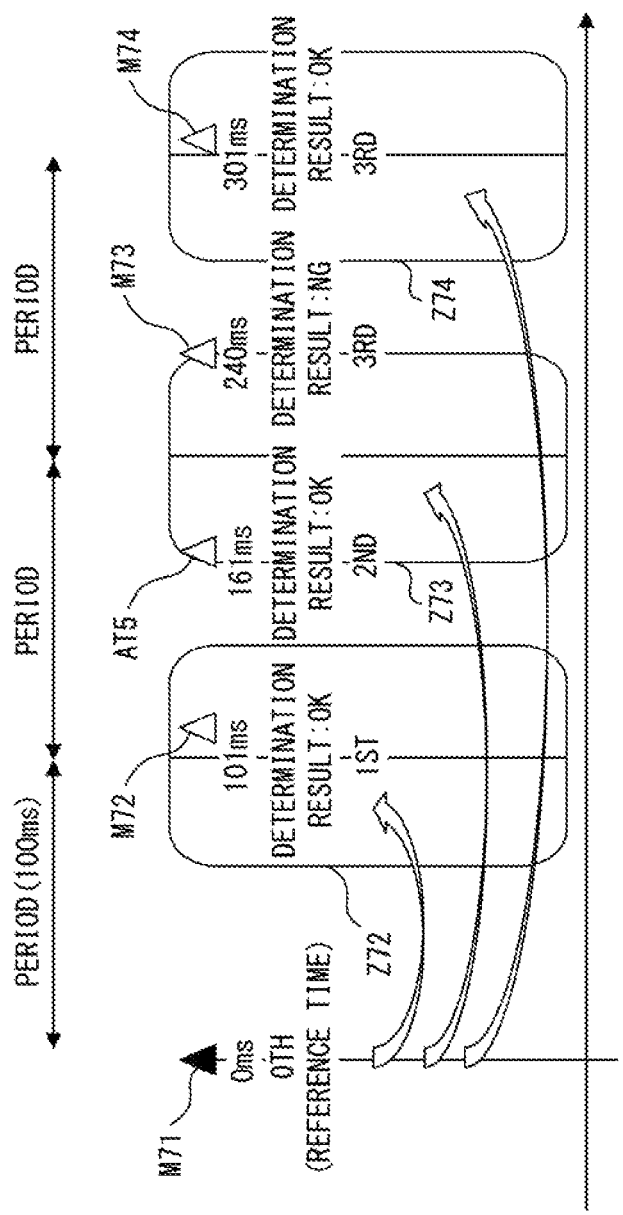
FIG. 19 is a diagram explaining an example of attack detection according to the sixth embodiment.

FIG. 19 is a diagram explaining an example of attack detection. In the example of FIG. 19 also, the attack detection device 10 stores the information provided in FIG. 7 and monitors an attack on periodic messages with ID=0x123. In FIG. 19, assume that the attack detection device 10 receives a periodic message M71 at 0 ms and sets the periodic message M71 to be a reference message of the messages with ID=0x123. In accordance with the processing explained with reference to FIG. 7, the calculation unit 21 generates a reception prediction 34 of the periodic messages with ID=0x123 (FIG. 7) by using the reception time of the periodic message M71 as a reference.

Next, assume that the transmission/reception unit 11 received a periodic message M72 with ID=0x123 at 101 ms. Because the ID of the periodic message M72 is 0x123, the determination unit 22 presumes that the periodic message M72 is the first message of the messages with ID=0x123 counted from the reference message. The determination unit 22 determines whether the reception time of the periodic message M72 is within a reception range in a case in which the order of reception is 1 in the reception prediction 34. In FIG. 19, the reception range of the first message counted from the reference message is, as indicated as a range Z72 or the reception prediction 34 (FIG. 7), 60 ms to 140 ms. Because the reception time of the periodic message is 101 ms, the determination unit 22 determines that the reception time of the periodic message M72 is within the range Z72. The determination unit 22 then determines that an attack has not been detected and records the reception time of the periodic message M72 in the reception condition information 32.

Next, assume that the transmission/reception unit 11 receives a message with ID=0x123 at 161 ms, and the message AT5 is an attack using ID=0x123. Because the ID of the message AT5 is 0x123, the determination unit 22 presumes that the message AT5 is the second message with ID=0x123 counted from the reference message. The determination unit 22 then determines whether the reception time of the message AT5 is within the 160 ms to 240 ms (a range Z73 in FIG. 19) that is the reception range in a case in which the order of reception is 2 in the reception prediction 34. Here, because the reception time of the message AT5 is 161 ms, the determination unit 22 determines that the second message AT5 counted from the reference message was received within the range Z73. Then the determination unit 22 determines that an attack has not been detected and records the reception time of the message AT5 in the reception condition information 32. Accordingly, in the example of FIG. 19, at the point in time at which the message AT5 is received, the following information is stored as the reception condition information 32.
Reception time of reference message (order of reception=0): 0 ms
Reception time of periodic message of order of reception=1: 101 ms
Reception time of periodic message of order of reception=2: 161 ms
Note that the order of reception of a periodic message in the reception condition information 32 is calculated on the basis of a reference message. The reception time recorded as a periodic message of the order of reception=2 is the reception time of the message AT5 used for an attack.

Assume that the transmission/reception unit 11 received a periodic message M73 with ID=0x123 at 240 ms. Because the ID of the periodic message M73 is 0x123, the determination unit 22 presumes that the periodic message M73 is the third message of the messages with ID=0x123 counted from the reference message. The determination unit 22 determines whether the reception time of the periodic message M73 is within the 260 ms to 340 ms (a range Z74 in FIG. 19) that is the reception range in a case in which the order of reception is 3 in the reception prediction 34. Here, because the reception time of the periodic message M73 is 240 ms, the determination unit 22 determines that the reception time of the third periodic message M73 counted from the reference message is not within the reception range Z74. Then the determination unit 22 determines that an attack has been detected.

The determination unit 22 may generate a notification message, as appropriate, to notify a device etc. operated by an operator of the detection of an attack. When the detection of an attack is notified, the determination unit 22 transmits the generated message to a notified party via the transmission/reception unit 11.

When an attack is detected, any of the periodic message M73 that is currently received and the messages received previously are presumed to be an attacking message. Considering this, when the message received next is a periodic message, the message is the third periodic message counted from the reference message. The determination unit 22 therefore does not change the order of reception of the message to be received next in order to continue the attack determination on the subsequent messages. Because the order of reception counted from the reference message is not changed, the determination unit 22 does not record the reception time of the periodic message M73 in the reception condition information 32. For that reason, the reception condition information 32 continues to have the following information.
Reception time of reference message (order of reception=0): 0 ms
Reception time of periodic message of order of reception=1: 101 ms
Reception time of periodic message of order of reception=2: 161 ms Afterwards, assume that the transmission/reception unit 11 received a periodic message M74 with ID=0x123 at 301 ms. Because the ID of the periodic message M74 is 0x123 and the reception condition information 32 has records of up to a message of the order of reception=2, the determination unit presumes that the periodic message M74 is the third message with ID=0x123 counted from the reference message. The determination unit 22 determines whether the reception time of the periodic message M74 is within the 260 ms to 340 ms (a range Z74 in FIG. 19) that is a reception range in a case in which the order of reception is 3 in the reception prediction 34. In the case of FIG. 19, because the reception time of the periodic message M74 is 301 ms, the determination unit 22 determines that the third periodic message M74 counted from the reference message was received within the range Z74. The determination unit 22, accordingly, determines that an attack has not been detected.

The determination unit 22 records the reception time of the periodic message M74 in the reception condition information 32. The attack detection device 10 therefore stores the following reception condition information 32 at the point in time at which the periodic message M74 was received.
Reception time of reference message (order of reception=0): 0 ms
Reception time of periodic message of order of reception=1: 101 ms
Reception time of periodic message of order of reception=2: 161 ms
Reception time of periodic message of order of reception=3: 301 ms As described above, in the sixth embodiment, although which message was used for an attack is not specified, an attack can be detected. Moreover, in the sixth embodiment, because counting up of the order of reception is temporarily suspended when an attack is detected, even though periodic messages are consecutively received after an attack was conducted, attack detection can be continued without resetting a reference message or the order of reception.

The processing explained with reference to FIG. 19 is merely an example and therefore the processing can be changed depending on the implementation. For example, a record of reception of messages used for attack detection may be included in the reception condition information 32 together with the determination result of whether the reception time of each message is within a reception range of the order of reception. In this case, as illustrated in FIG. 19 as an example, the reception condition information 32 when the messages M71 and M72, the attacking message AT5, and the message M73 are received is as below.
Reception time of reference message (order of reception=0): 0 ms
Reception time of periodic message of order of reception=1: 101 ms Reception time of periodic message of order of reception=2: 161 ms Reception time of periodic message of order of reception=3: 240 ms (determination result is NG)

Although the reception condition information 32 includes a record of a message of the order of reception=3 when the message M74 was received, the determination result was NG. Therefore, the determination unit 22 handles the message M74 as a periodic message of the order of reception=3. Consequently, the determination result of the message M74 becomes a OK, and the reception condition information 32 is updated as below.

Reception time of reference message (order of reception=0): 0 ms

Reception time of periodic message of order of reception=1: 101 ms

Reception time of periodic message of order of reception=2: 161 ms

Reception time of periodic message of order of reception=3: 240 ms (determination result is NG) Reception time of periodic message of order of reception=3: 301 ms The subsequent processing is the same as the processing in the case in which a record of reception of messages used for attack detection is not included in the reception condition information 32.

In FIG. 19, a case in which a single attack is detected after periodic messages is explained. However, the frequency of attack detection can be arbitrarily set. In the embodiment, a case in which a reception time is within a reception range of the presumed order of reception is represented as "OK" and a case in which a reception time is not within a reception range of the presumed order of reception is represented as "NG". Assume that the determination result of the determination unit 22 became OK, NG, NG, NG. As explained with reference to FIG. 19, the order of reception is not counted up as long as NG is obtained in the determination. For that reason, all the messages from the second message (the first message that is determined to be NG) to the fourth message that the attack detection device 10 received are presumed to be the second periodic message. In addition, because the fourth message is determined to be NG, the fifth message received by the attack detection device 10 is also presumed to be the second periodic message by the determination unit 22. Therefore, when the fifth received message is a periodic message received within the predicted range, the determination result can be OK, NG, NG, NG, OK.

Figure 20:
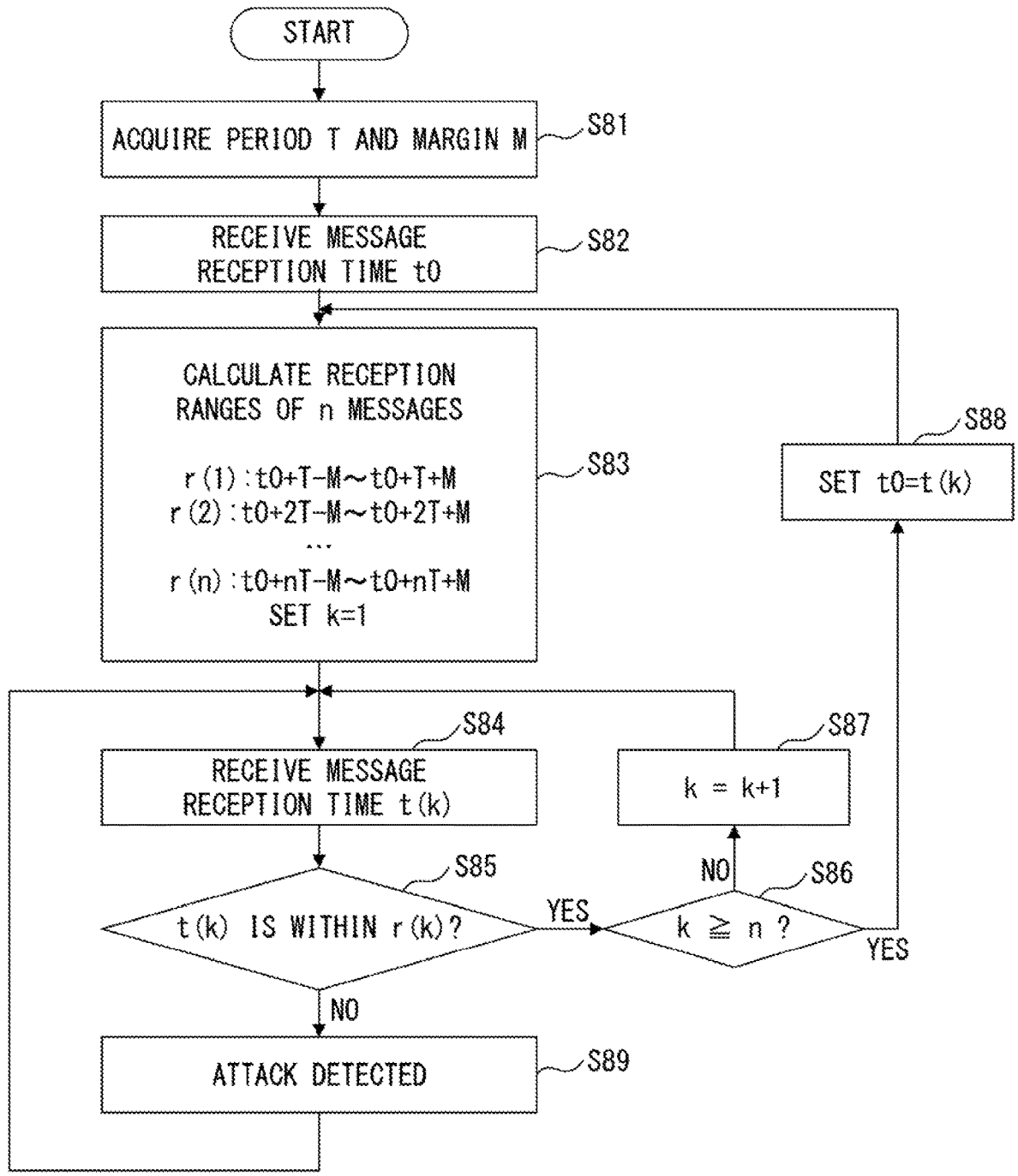
FIG. 20 is a flowchart explaining an example of the processing of the attack detection device.

FIG. 20 is a flowchart explaining an example of the processing of the attack detection device 10. In FIG. 20, a constant n and a variable k are used. The constant n is the number of reception ranges calculated by the calculation unit 21. The variable k is a variable used to count the order of reception of periodic messages. The processing in steps S81 to 85 is the same as the processing insteps S11 to S15 explained with reference to FIG. 10.

When the reception time t(k) is within r(k), the determination unit 22 does not detect an attack based on the kth message (Yes in step S85). The determination unit 22 then determines whether the variable k is equal to or larger than the constant n (step S86). When the variable k is less than the constant n, the attack detection device 10 has not received n messages (No in step S86). The determination unit 22 increments the variable k by 1 and the processing returns to step S84 (step S87).

On the other hand, when the variable k is equal to or larger than the constant n, the attack detection device 10 has received n messages (Yes in step S86). The reference update processing unit 23 sets the reception time t(k) of the kth message to the reception time t0 of the reference message and the processing returns to step S83 (step S88).

Meanwhile, when the reception time t (k) is not within r(k), the determination unit 22 detects an attack (No in step S85, step S89). The determination unit 22 performs processing of attack detection notification as appropriate and afterwards the processing returns to step S84. Note that when the determination is No in step S85, the order of reception is not incremented. In other words, the order of reception of the received messages is temporarily invalid at the time at which an attack is detected.

FIG. 20 is merely an example and the procedures can be changed depending on the implementation. For example, when the variable k is equal to or larger than the constant n (Yes in step S86), the procedures can be modified so that the processing returns to step S82 without the processing in step S88. When such a modification is applied, after n messages are received by the attack detection device 10, a message to be received next is set as a reference and attack detection is performed.

Furthermore, as explained with reference to FIG. 20, when the order of reception of periodic messages is counted by using the variable k, the determination unit 22 can specify the order of reception by using the variable k without referencing the reception condition information 32 that is explained with reference to FIG. 19. In this case, a modification may be made so that the reception condition information 32 is not generated.

In the sixth embodiment, at the point in time at which an attack is detected, the determination unit 22 eliminates the deviation of the order of reception generated by reception of a message used for the detected attack by temporarily invalidating the order of reception of received messages. Accordingly, in the sixth embodiment, after an attack is detected, detection of the subsequent attack that appears to be a periodic message can be continued because the deviation of the order of reception of periodic messages due to a message used for the detected attack is eliminated.

<Others>

Note that the embodiments are not limited to those provided above, but various modifications can be adopted. Some examples of such modifications are provided below.

For example, in FIG. 8, a case in which reception ranges of plural messages are collectively calculated and recorded in the reception prediction 34 is explained. However, only a reception range of one of the second and the subsequent messages that are possibly received may be recorded in the reception prediction 34. In this case, as explained in the third and the fifth embodiments, the calculation unit 21 calculates a reception range of one message with the reception of one message. This can be applied to the first and the second embodiments. More specifically, when the number of messages received until the reference time is reselected is n, only the reception range of the n-th message is recorded, and when the first to the n−1th message are received, the number of received messages is merely counted.

In the above description, the attack detection processing of one ID is explained. However, a single attack detection device 10 may perform the attack detection processing of plural IDs in parallel. In this case, because the attack detection device 10 receives messages with plural IDs in parallel as illustrated in FIG. 5, information such as the transmission condition 31, the reception condition information 32, the reference time 33, and the reception prediction 34 is stored for each ID of the received messages.

Furthermore, the attack detection device 10 may communicate with an operation terminal operated by an operator. In this case, the attack detection device 10 can obtain information such as the transmission condition 31 via the operation terminal.

In the above description, an example of operations of the attack detection device 10 is explained taking a standard CAN as an example. However, even when the data frames used for a communication have the extended specifications, the same processing is executed. Moreover, in a case in which the network specification is CAN FD (CAN with Flexible Data rate), the attack detection device 10 can also detect an attack in the same manner. Accordingly, it is possible to improve the accuracy of attack detection.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An attack detection device comprising:
   a storage;
   a receiver configured to receive messages periodically transmitted from a communication device in a network; and
   a processor configured to execute a process including:
   calculating a plurality of reception ranges in which periodic messages are predicted to be received, the periodic messages each including identification information identical to that included in a reference message that is selected from the received messages and each being transmitted two or more periods after the reference message, the reception ranges each being calculated by using a transmission period of its corresponding periodic message identified by the identical identification information;
   storing, in the storage, the reception ranges and orders in association with each other, each of the orders being a predicted order of reception of its corresponding periodic message, the predicted order being predicted in reference to the reference message; and
   determining that an attack on the network is detected when a reception time of a certain message including the identification information does not belong to a reception range associated with the order of reception of the certain message among the reception ranges each associated, in the storage, with the order of reception of its corresponding periodic message in reference to the reference message.

2. The attack detection device according to claim 1, the process further comprising:
   calculating reception ranges of a plurality of messages transmitted two or more periods after the reference message by using a reception time of the reference message and the transmission period.

3. The attack detection device according to claim 1, the process further comprising:
   calculating a reception range of a second received message that is received after a prescribed number of messages from a first received message that is received after the reference message by using a reception time of the first received message and the transmission period; and
   associating the calculated reception range of the second received message with the order of reception of the second received message in a case where the reference message is used as a reference.

4. The attack detection device according to claim 1, the process further comprising:
   calculating a starting time of a reception range of each of messages transmitted two or more periods after the reference message; and
   determining that an attack on the network is detected when the reception time of the received message including the identification information is before the starting time of the reception range associated with the order of reception of the received message in a case where the reference message is used as a reference.

5. The attack detection device according to claim 1, the process further comprising:
   invalidating the order of reception of the received message when the reception time of the received message is not within the reception range associated with the order of reception.

6. An attack detection method executed by a processor, the attack detection method comprising:
   receiving messages periodically transmitted from a communication device in a network;
   calculating a plurality of reception ranges in which periodic messages are predicted to be received, the periodic messages each including identification information identical to that included in a reference message that is selected from the received messages and each being transmitted two or more periods after the reference message, the reception ranges each being calculated by using a transmission period of its corresponding periodic message identified by the identical identification information;
   storing the reception ranges and orders in association with each other, each of the orders being a predicted order of reception of its corresponding periodic message, the predicted order being predicted in reference to the reference message; and
   determining that an attack on the network is detected when a reception time of a certain message including the identification information does not belong to a reception range associated with the order of reception of the certain message among the reception ranges each associated with the order of reception of its corresponding periodic message in reference to the reference message.

7. The attack detection method according to claim 6, the method further comprising
   calculating reception ranges of a plurality of messages transmitted two or more periods after the reference message by using a reception time of the reference message and the transmission period.

8. The attack detection method according to claim 6, the method further comprising:
   calculating a reception range of a second received message that is received after a prescribed number of messages from a first received message that is received after the reference message by using a reception time of the first received message and the transmission period; and
   associating the calculated reception range of the second received message with the order of reception of the second received message in a case where the reference message is used as a reference.

9. The attack detection method according to claim 6, the method further comprising:
calculating a starting time of a reception range of each of messages transmitted two or more periods after the reference message; and
determining that an attack on the network is detected when the reception time of the received message including the identification information is before the starting time of the reception range associated with the order of reception of the received message in a case where the reference message is used as a reference.

10. The attack detection method according to claim 6, the method further comprising
invalidating the order of reception of the received message when the reception time of the received message is not within the reception range associated with the order of reception.

11. A non-transitory computer-readable recording medium having stored therein an attack detection program that causes a computer to execute a process comprising:
receiving messages periodically transmitted from a communication device in a network;
calculating a plurality of reception ranges in which periodic messages are predicted to be received, the periodic messages each including identification information identical to that included in a reference message that is selected from the received messages and each being transmitted two or more periods after the reference message, the reception ranges each being calculated by using a transmission period of its corresponding periodic message identified by the identical identification information;
storing the reception ranges and orders in association with each other, each of the orders being a predicted order of reception of its corresponding periodic message, the predicted order being predicted in reference to the reference message; and
determining that an attack on the network is detected when a reception time of a certain message including the identification information does not belong to a reception range associated with the order of reception of the certain message among the reception ranges each associated with the order of reception of its corresponding periodic message in reference to the reference message.

12. The non-transitory computer-readable recording medium according to claim 11, the process further comprising
calculating reception ranges of a plurality of messages transmitted two or more periods after the reference message by using a reception time of the reference message and the transmission period.

13. The non-transitory computer-readable recording medium according to claim 11, the process further comprising:
calculating a reception range of a second received message that is received after a prescribed number of messages from a first received message that is received after the reference message by using a reception time of the first received message and the transmission period; and
associating the calculated reception range of the second received message with the order of reception of the second received message in a case where the reference message is used as a reference.

14. The non-transitory computer-readable recording medium according to claim 11, the process further comprising:
calculating a starting time of a reception range of each of messages transmitted two or more periods after the reference message; and
determining that an attack on the network is detected when the reception time of the received message including the identification information is before the starting time of the reception range associated with the order of reception of the received message in a case where the reference message is used as a reference.

15. The non-transitory computer-readable recording medium according to claim 11, the process further comprising:
invalidating the order of reception of the received message when the reception time of the received message is not within the reception range associated with the order of reception.

* * * * *